(12) United States Patent
Szekely

(10) Patent No.: US 10,679,528 B2
(45) Date of Patent: Jun. 9, 2020

(54) HYBRID ILLUMINATED INDICATOR SIGN

(71) Applicant: ASTRA CAPITAL INCORPORATED, Mississauga (CA)

(72) Inventor: Kenneth Szekely, Mississauga (CA)

(73) Assignee: ECOGLO HOLDINGS NA INC., Mississauga (CA)

( * ) Notice: Subject to any disclaimer, the term of this patent is extended or adjusted under 35 U.S.C. 154(b) by 347 days.

(21) Appl. No.: 15/043,554

(22) Filed: Feb. 13, 2016

(65) Prior Publication Data

US 2018/0226003 A1  Aug. 9, 2018

Related U.S. Application Data

(60) Provisional application No. 62/116,360, filed on Feb. 13, 2015.

(51) Int. Cl.
*G09F 13/20* (2006.01)
*F21V 8/00* (2006.01)
(Continued)

(52) U.S. Cl.
CPC .............. *G09F 13/20* (2013.01); *G02B 6/006* (2013.01); *G02B 6/0088* (2013.01); *G09F 11/00* (2013.01);
(Continued)

(58) Field of Classification Search
CPC .......... G09F 13/20; G09F 11/00; G09F 13/04; G09F 13/18; G09F 2013/0459;
(Continued)

(56) References Cited

U.S. PATENT DOCUMENTS 6,843,010 B2   1/2005  Robinson et al.
7,246,932 B2 *  7/2007  Burtsev ............... G02B 6/0001
                                                  362/23.16
(Continued)

FOREIGN PATENT DOCUMENTS

JP    2008122798        5/2008
JP    2008180989 A  *   8/2008
(Continued)

OTHER PUBLICATIONS

ISDEC, Office Action for CA Application No. 2920722, dated Sep. 28, 2018.
(Continued)

*Primary Examiner* — Cassandra Davis
(74) *Attorney, Agent, or Firm* — Hodgson Russ LLP

(57) ABSTRACT

A hybrid illuminated indicator sign for visually displaying indicators when the hybrid illuminated indicator sign is electrically powered and for at least a period of time when the hybrid illuminated indicator sign is no longer electrically powered comprises a light guide plate having a light receiving edge and a light emitting face, an intermediate translucent photo-luminescent layer at least partially covering the light emitting face of the light guide plate, an outer indicator layer at least partially covering the intermediate translucent photo-luminescent layer, and an electrically powered light source mounted adjacent the light receiving edge of the light guide plate.

17 Claims, 15 Drawing Sheets

(51) Int. Cl.
*G09F 13/18* (2006.01)
*G09F 11/00* (2006.01)
*G09F 13/04* (2006.01)

(52) U.S. Cl.
CPC .............. *G09F 13/04* (2013.01); *G09F 13/18* (2013.01); *G02B 6/0055* (2013.01); *G02B 6/0063* (2013.01); *G02B 6/0076* (2013.01); *G09F 2013/0459* (2013.01); *G09F 2013/1881* (2013.01)

(58) Field of Classification Search
CPC .......... G09F 2013/1881; G02B 6/0088; G02B 6/006; G02B 6/0063; G02B 6/0055; G02B 6/0076
See application file for complete search history.

(56) References Cited

U.S. PATENT DOCUMENTS

| | | | |
|---|---|---|---|
| 8,539,702 B2 | 9/2013 | Li et al. | |
| 9,864,125 B2 * | 1/2018 | Gierens | B32B 17/10036 |
| 2004/0244247 A1 | 12/2004 | Bolta | |
| 2006/0080873 A1 * | 4/2006 | Riopel | G02B 6/005 |
| | | | 40/546 |
| 2006/0291187 A1 | 12/2006 | Huang | |
| 2010/0018092 A1 | 1/2010 | Peckham | |
| 2010/0027293 A1 * | 2/2010 | Li | G02B 6/002 |
| | | | 362/619 |
| 2012/0102799 A1 | 5/2012 | Roberts et al. | |
| 2012/0227296 A1 | 9/2012 | Roberts et al. | |
| 2013/0199064 A1 * | 8/2013 | O'Kell | G09F 13/18 |
| | | | 40/542 |
| 2013/0291413 A1 | 11/2013 | Lifka et al. | |
| 2015/0007468 A2 | 1/2015 | Roberts et al. | |
| 2018/0203180 A1 * | 7/2018 | Horner | G02B 6/0073 |

FOREIGN PATENT DOCUMENTS

KR 100715004 5/2007
WO 2009025566 A1 2/2009

OTHER PUBLICATIONS

ISDEC, Office Action for CA Application No. 2920722, dated Mar. 1, 2019.

* cited by examiner

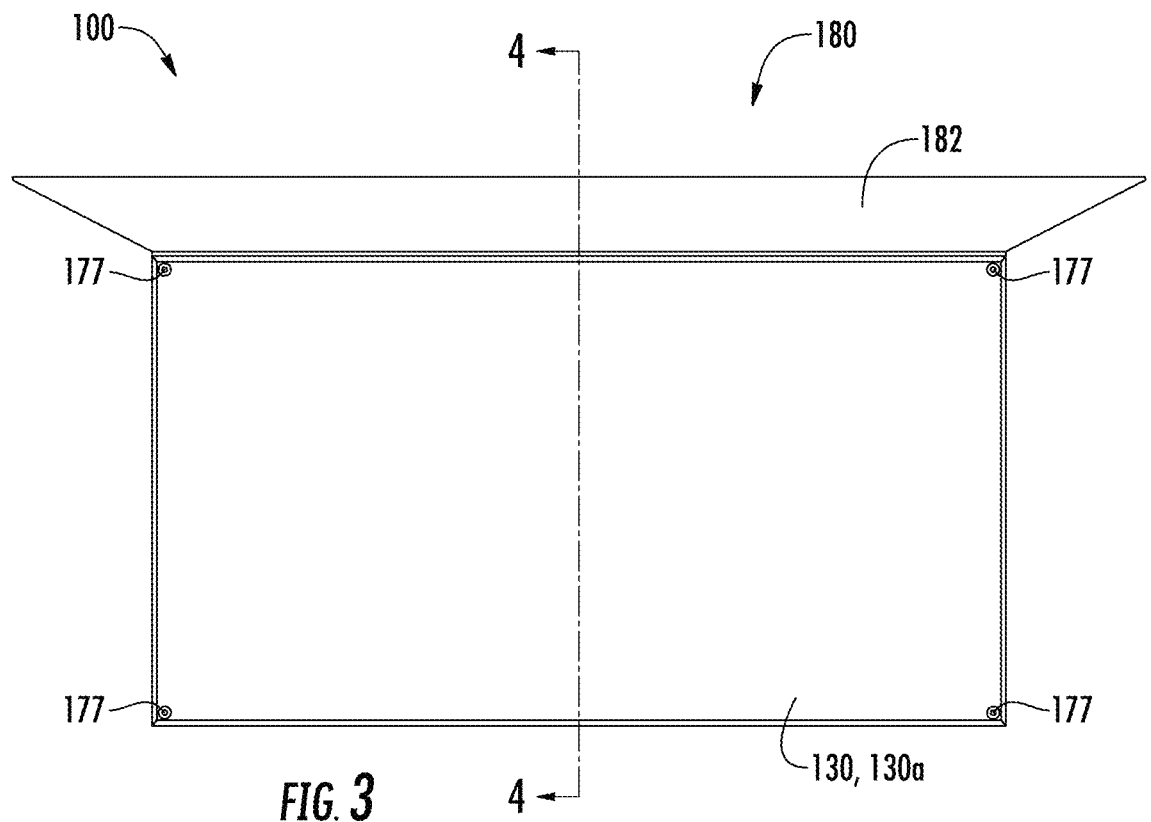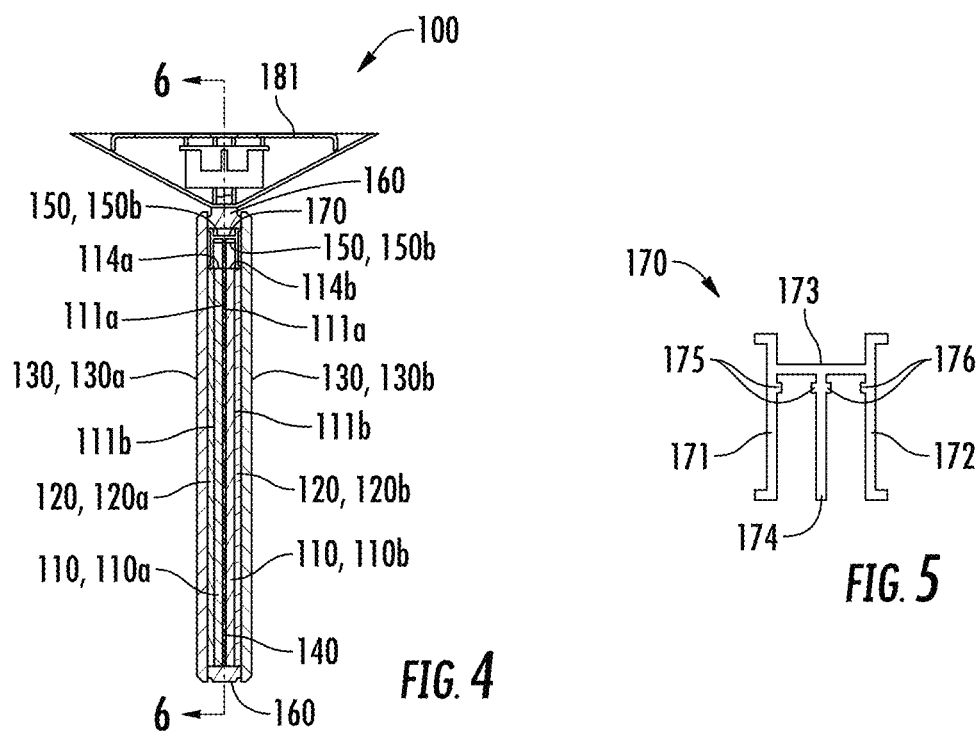

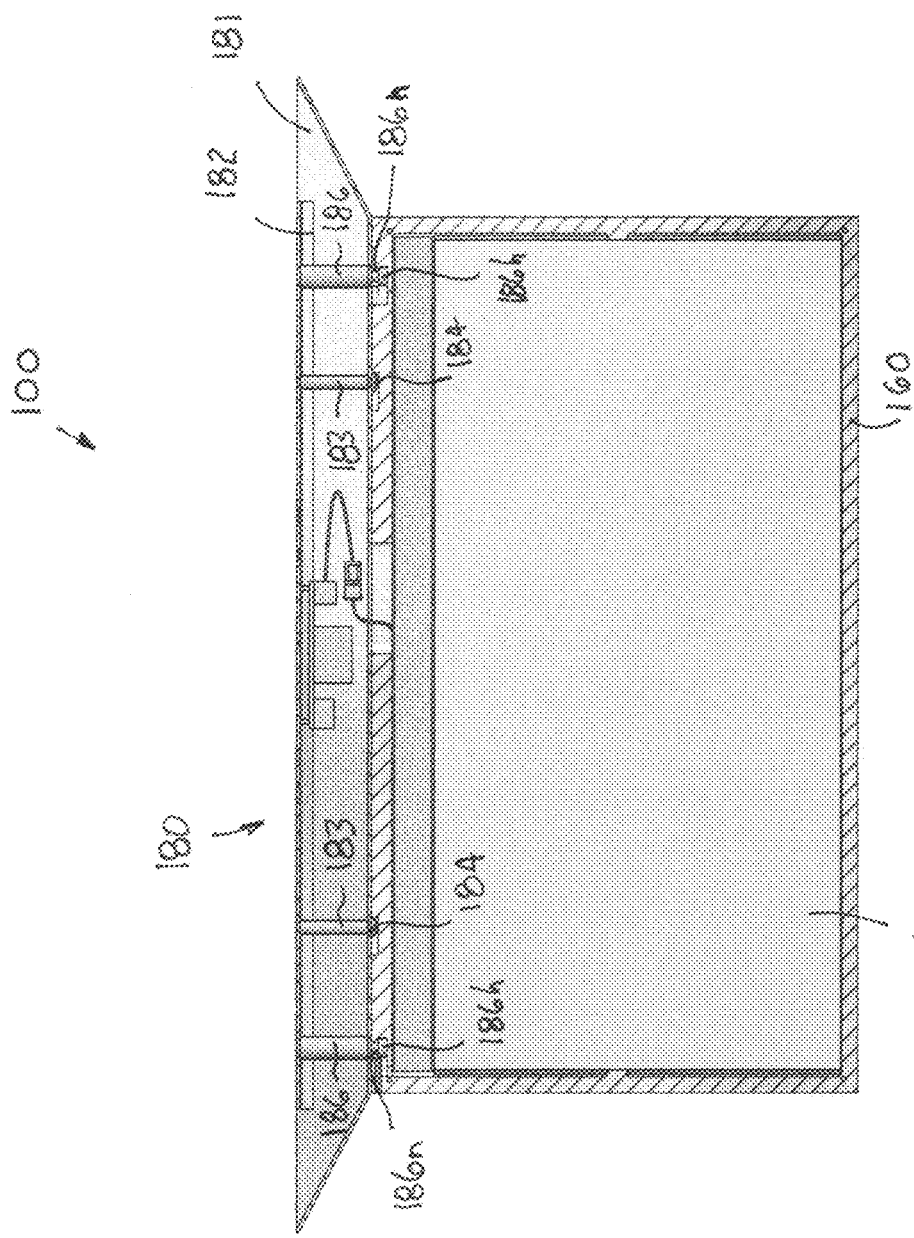

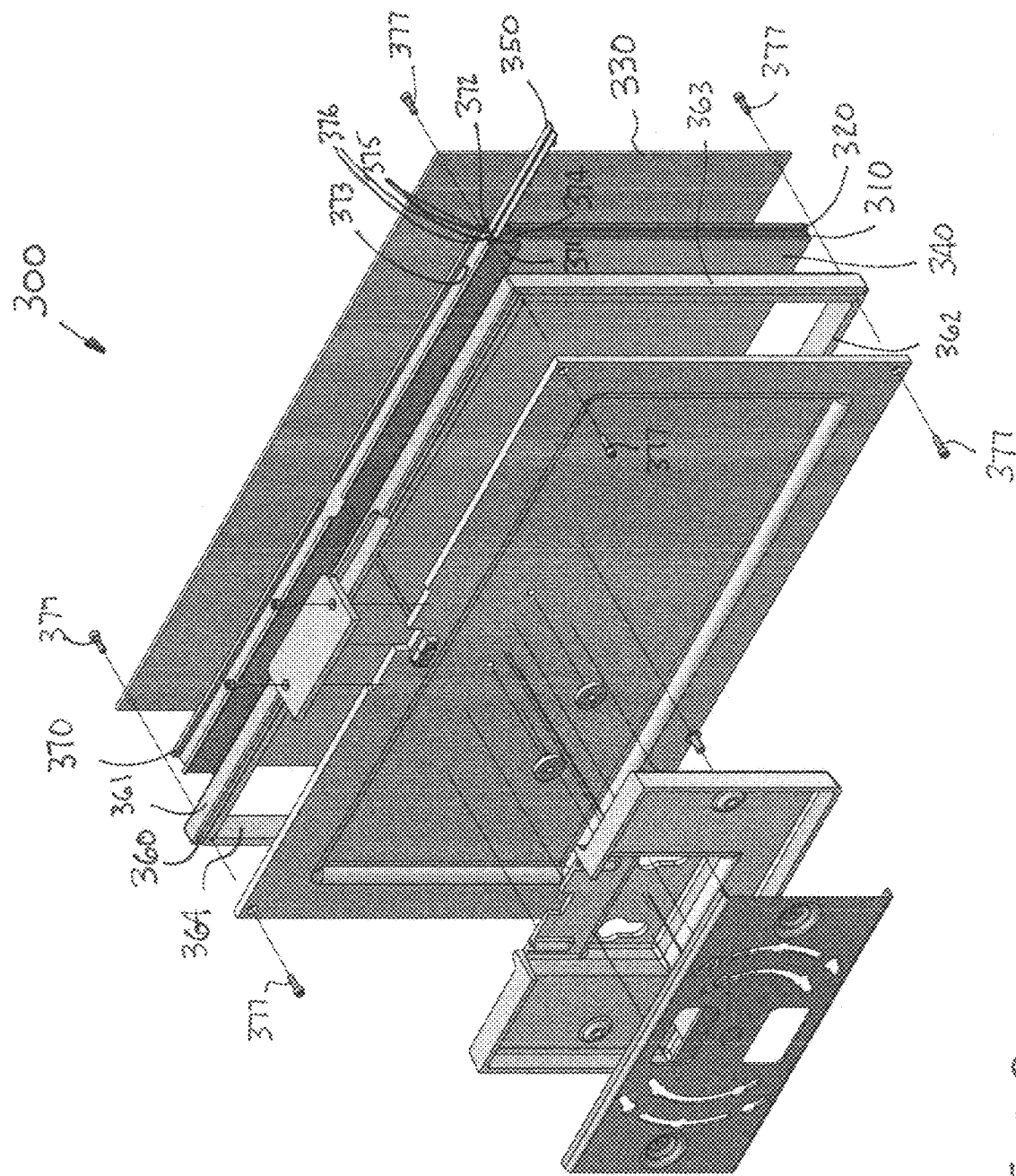

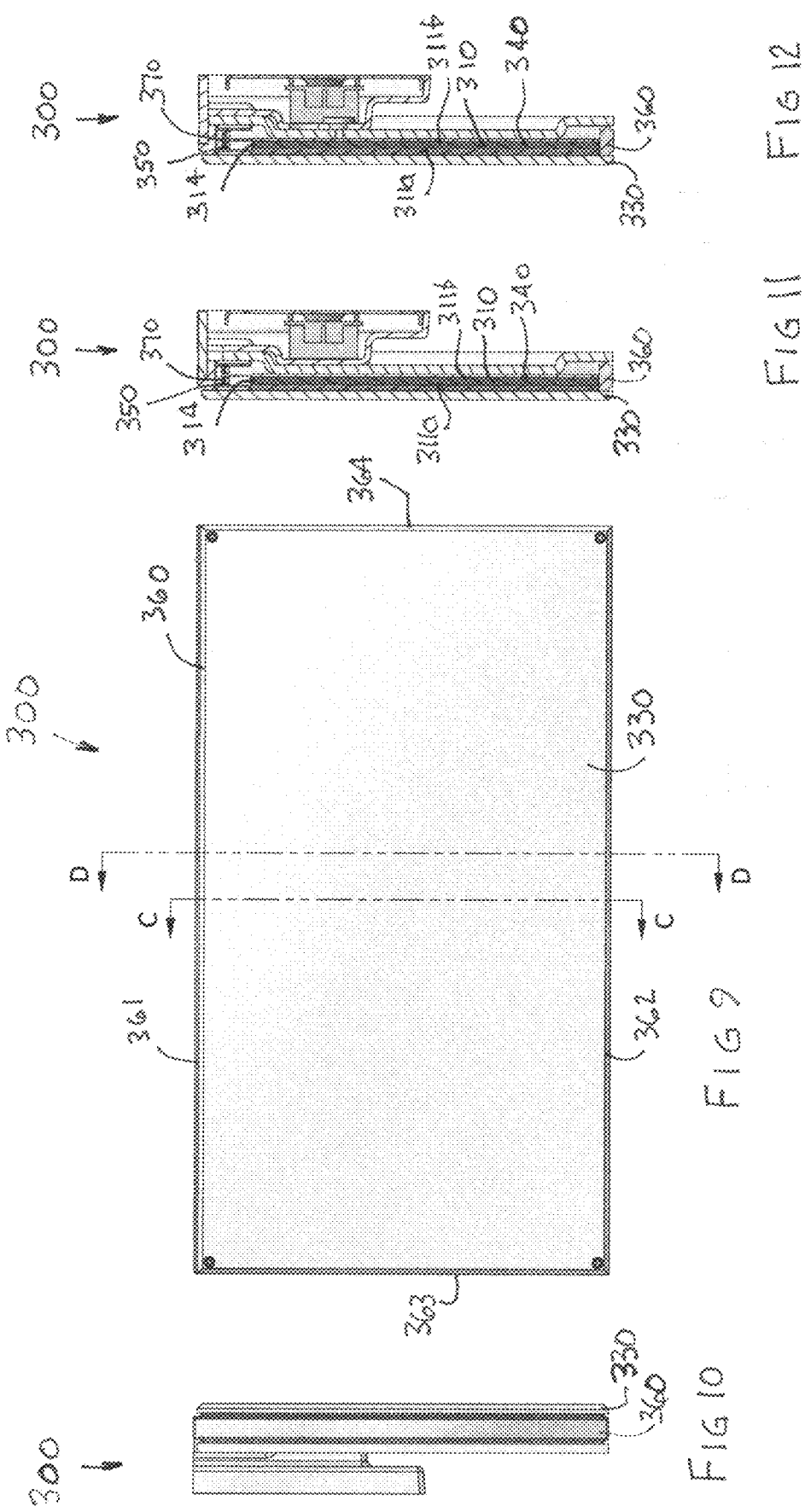

HYBRID ILLUMINATED INDICATOR SIGN

RELATED APPLICATIONS

This application is a non-provisional application claiming priority to U.S. Provisional Patent Application Ser. No. 62/116,360, filed on Feb. 13, 2015, which is herein incorporated by reference.

FIELD OF THE INVENTION

The present invention relates to illuminated indicator signs, and more particularly to illuminated indicator signs having both an electrically powered light source and a photo-luminescent light source.

BACKGROUND OF THE INVENTION

Indicator signs, such as exit signs and the like, are mandated by legislation to be mounted in strategic locations in commercial buildings. Such indicator signs are used to indicate the location of an adjacent building exit, the hallways leading to such exits, and so on. These indicator signs are typically mounted either on the walls that define the hallways or rooms, or the ceiling overhead. In the event of a fire or other emergency, indicator signs often play a life-saving role in assisting people to quickly navigate the hallways of a building and exit the building safely.

Most prior art indicator signs are illuminated to be visible in the dark by way of light emitting diode (LED) type lights mounted within the sign. The light emitting diode (LED) powered signs would of course be illuminated only while electrical power is available, either from a conventional hydro-electric source or from a back-up power system, either generator or battery. However, these types of signs cannot illuminate when no electrical power is available, which might happen during extreme and/or unusual conditions. The resulting non-illuminated indicator signs could be very unsafe in this situation.

In response to this potentially unsafe situation, some prior art indicator signs uses photo-luminescent material without light emitting diode (LED) type lights, as a source of illumination.

United States Published Patent Application No. 2010/0018092, published Jan. 28, 2010, to Peckham, and entitled, discloses a Photo-luminescent Exit Signs And Methods For Forming Same. The photo-luminescent sign includes a generally planar faceplate comprising a plurality of openings defining various characters. At least some of the periphery of the openings comprises an angle relative to the surface of the faceplate. A backplate has a photo-luminescent material and is disposed adjacent to the faceplate so as to result in the illuminated letters defining the various characters.

WIPO Published Patent Application No. WO2009/025566, published Feb. 26, 2009, to Rotarski, and entitled Photo-Luminescent Visual Information Sign, discloses a photo-luminescent visual information sign comprising a transparent plate with a photo-luminescent layer applied on one face. The photo-luminescent layer has the required indicators. The transparent plate with a photo-luminescent layer are secured with a cover of removable protective foil. The opposite face of the transparent plate has a colored layer that is the background for the image. A foam foil having adhesive on both sides is also applied to the same face of the transparent plate as the colored layer, for mounting the sign.

The disadvantage of these types of indicator sign is that it must be placed near a significant source of illumination in order to retransmit sufficient light to be acceptable.

Also in response to this potentially unsafe situation, some prior art indicator signs that are usually lit by light emitting diode (LED) type lights, also illuminate when no electrical power is available. Typically, this is accomplished by additionally employing a photo-luminescent material in some capacity in conjunction with light emitting diodes (LEDs) to light, to provide a hybrid light source. Various ones of these hybrid light source indicator signs will now be discussed, along with their various disadvantages.

United States Published Patent Application No. 2006/0291187, published Dec. 28, 2006, to Huang, and entitled Illuminated Sign, discloses an illuminated sign that stores light energy and emits light spontaneously, via a photo-luminescent and marking layer that absorbs light, to make an icon on the photo-luminescent and marking layer visible. The light is generated from a light emitting module that couples to a power supply module for getting power. The photo-luminescent and marking layer is disposed on an opaque substrate. Moreover, the device can also emit light by a photo-luminescent layer that receives light from the light emitting module and stores the light energy so as to illuminate the icon on a marking layer over the photo-luminescent and marking layer. Problems with this design include the following. The photo-luminescent and marking layer is small compared to the overall size of the sign. Accordingly, only a fraction of the light energy shining on the sign from the light emitting diodes (LEDs) is actually absorbed by the photo-luminescent material.

United States Published Patent Application No. 2013/0199064, published Aug. 8, 2013, to Okell, and entitled Signs, discloses a sign having a sign plate mounted in a frame to display an image when illuminated. The sign includes an electrically powered light source configured for edge lighting of the sign. The sign plate has a front portion, a rear portion and an intermediate portion between the front and rear portions. The rear portion provides a photo-luminescent light source for back lighting the sign. The sign is edge lit when the electrically powered light source is in use and is backlit by the photo-luminescent light source in darkness or low ambient light conditions when the electrically powered light source is not in use. Problems with this design include the following. The light-passing front portion is not configured to maximize the amount of light transmitted from the light emitting diodes (LEDs) and through the light-passing front portion and out of the front surface thereof. Further, it appears that the intermediate portion may reflect light, in which case the photo-luminescent rear portion has no apparent effect, or the intermediate portion may pass light, in which case there is no significant reflection of light emitted from the back side of the front portion.

U.S. Pat. No. 6,843,010, issued Jan. 18, 2005, to Robinson et al, and entitled Sign With Photo-Luminescent And Current-Generated Lighting, discloses a sign having a light-conductive and transparent front panel mounted in a frame. Etched characters are formed on a rear surface of the front panel, and photo-luminescent characters are disposed in overlying relation to the etched character. A strip of light emitting diodes (LED's) is mounted in the frame adjacent to a side wall of the front panel. Mounting members are formed on the frame to position and hold the front panel in place. Problems with this design include the following. The light-passing front panel is not configured to maximize the amount of light transmitted from the light emitting diodes (LEDs) and through the light-passing front panel and out of the front surface thereof. Further, the light-passing front panel is not configured to maximize the amount of light transmitted from the light emitting diodes (LEDs) to the photo-luminescent material. Also, the photo-luminescent indicators are small compared to the overall size of the sign. Accordingly, only a fraction of the light energy shining on the sign from the light emitting diodes (LEDs) is actually absorbed by the photo-luminescent material. Further, the indicators cannot readily be changed.

United States Published Patent Application No. 2012/0102799, published May 3, 2012, to Roberts et al., and United States Published Patent Application No. 2012/0227296, published Sep. 13, 2012, to Roberts et al., and United States Published Patent Application No. 2015/0007468, published Jan. 8, 2015, to Roberts et al., each entitled Current-Generated Photo-Luminescent Hybrid Sign, disclose a sign having a peripheral frame that retains a rear plate and a dual front plate comprising an inner cover plate and an outer cover plate. A large internal space separates the rear plate and the inner cover plate. The outer cover plate has a character aperture and characters of a photo-luminescent material are secured to the outer surface of the inner cover plate. An LED strip is disposed at the bottom of the interior of the sign provide illumination when the power is on. Problems with this design include the following. The light-passing inner cover plate is not configured to maximize the amount of light transmitted from the light emitting diodes (LEDs) and through the light-passing front panel and out of the front surface thereof. Further, the light-passing inner cover plate is not configured to maximize the amount of light transmitted from the light emitting diodes (LEDs) to the photo-luminescent material. Further, the indicators cannot readily be changed.

United States Published Patent Application No. 2004/0244247, published Dec. 9, 2004, to Bolta, and entitled Photo-Luminescent And Light Source Combination Exit Sign, discloses a sign comprising a photo-luminescent material and at least one light source adjacent the photo-luminescent material for charging the photo-luminescent material. Problems with this design include the following. The light emitting diodes (LEDs) and the photo-luminescent material are not positioned to maximize the amount of light transmitted from the light emitting diodes (LEDs) to the photo-luminescent material. Also, the photo-luminescent and marking layer is small compared to the overall size of the sign. Further, the indicators cannot readily be changed.

United States Published Patent Application No. 2013/0291413, published Nov. 7, 2013, to Lifka et al, discloses a light collector comprising a luminescent material element and a discontinuous semi-transparent layer adjacent to a first side of the luminescent material element. Due to the discontinuity of the semi-transparent layer, at least one first portion of the luminescent material element covered by the semi-transparent layer and at least one second portion of the luminescent material element not covered by the semi-transparent layer are formed. A light generating means is arranged at a second side of the luminescent material element. Further, a method for concentrating light in a light collector is provided, comprising the following method steps: capturing light from the environment by means of a luminescent material, concentrating the light in the luminescent material by means of a semi-transparent layer arranged on the luminescent material and light generating means, emitting the light in a pre-determined area of the light collector by means of an out-coupling structure so as to generate a pre-determined light emitting image.

U.S. Pat. No. 8,539,702 issued Sep. 24, 2013, to Li et al, discloses a light source comprising a blue emitting LED operable to generate blue excitation light and a light emitting surface comprising a light transmissive substrate and a phosphor. The LED is configured to irradiate the light emitting surface with excitation light such that the phosphor emits light of a second wavelength. Light emitted by the source comprises a combination of blue light from the LED and the second wavelength light from the phosphor. The light emitting surface is interchangeable thereby enabling the source to generate different selected colors of light using the same LED. The phosphor can be provided as a layer on the substrate or incorporated within the light transmissive substrate. The light emitting surface can be configured as a waveguide or as a light transmissive window.

United States Published Patent Application No. 2012/0227296 published Sep. 13, 2012, to Roberts et al, discloses a current-generated photo-luminescent hybrid sign that includes one or more light emitting elements within a channel in the frame to evenly distribute light, while concurrently energizing a photo-luminescent material in case of power outage. A hybrid current-generated photo-luminescent sign generally includes a frame, a front face plate, a rear plate, a mounting bracket, a light source and a power converter. The light source is disposed within a channel structure defined by the frame. The light from the light source shines upwardly to energize indicator characters in case of a power outage.

It has also been found, through experimentation, that it is difficult to get the photo-luminescent material to glow evenly, or in other words to emit a reasonably constant level of light across its entire surface, due to the placement of the light emitting diodes (LEDs) with respect to the photo-luminescent material. It is believed that at least most of the electrically powered prior art signs discussed above would have this problem.

It is an object of the present invention to provide a hybrid illuminated indicator sign for visually displaying indicators when the hybrid illuminated indicator sign is electrically powered and for at least a period of time when the hybrid illuminated indicator sign is no longer electrically powered.

It is another object of the present invention to provide a hybrid illuminated indicator sign for visually displaying indicators when the hybrid illuminated indicator sign is electrically powered and for at least a period of time when the hybrid illuminated indicator sign is no longer electrically powered, wherein The hybrid illuminated indicator sign emits at least a threshold amount of illumination for at least a threshold period of time when The hybrid illuminated indicator sign loses electrical power.

It is another object of the present invention to provide a hybrid illuminated indicator sign for visually displaying indicators when the hybrid illuminated indicator sign is electrically powered and for at least a period of time when the hybrid illuminated indicator sign is no longer electrically powered, wherein the indicators of The hybrid illuminated indicator sign are viewable from both opposed sides of the sign.

It is another object of the present invention to provide a hybrid illuminated indicator sign for visually displaying indicators when the hybrid illuminated indicator sign is electrically powered and for at least a period of time when the hybrid illuminated indicator sign is no longer electrically powered, wherein the indicators of The hybrid illuminated indicator sign are readily changeable.

It is another object of the present invention to provide a hybrid illuminated indicator sign for visually displaying indicators when the hybrid illuminated indicator sign is electrically powered and for at least a period of time when the hybrid illuminated indicator sign is no longer electrically powered, wherein The hybrid illuminated indicator sign is easy to install and replace.

It is another object of the present invention to provide a hybrid illuminated indicator sign for visually displaying indicators when the hybrid illuminated indicator sign is electrically powered and for at least a period of time when the hybrid illuminated indicator sign is no longer electrically powered, wherein the photo-luminescent material glows evenly, or in other words to emits a reasonably constant level of light across its entire surface.

It is yet another object of the present invention to provide a hybrid illuminated indicator sign for visually displaying indicators when the hybrid illuminated indicator sign is electrically powered and for at least a period of time when the hybrid illuminated indicator sign is no longer electrically powered, wherein the hybrid illuminated indicator sign has a slim profile.

SUMMARY OF THE INVENTION

In accordance with one aspect of the present invention there is disclosed a novel hybrid illuminated indicator sign for visually displaying indicators when the hybrid illuminated indicator sign is electrically powered and for at least a period of time when the hybrid illuminated indicator sign is no longer electrically powered. The hybrid illuminated indicator sign comprises a light guide plate having a light receiving edge and a light emitting face; an intermediate translucent photo-luminescent layer at least partially covering the light emitting face of the light guide plate; an outer indicator layer at least partially covering the intermediate translucent photo-luminescent layer; and an electrically powered light source mounted adjacent the light receiving edge of the light guide plate. In use, when the electrically powered light source is emitting light, the emitted light enters the light guide plate through the light receiving edge and is re-directed to the intermediate translucent photo-luminescent layer to thereby cause photo-excitation thereof, partially through the intermediate translucent photo-luminescent layer to the outer indicator layer, and partially through the outer indicator layer to be visible from the exterior of the hybrid illuminated indicator sign; and, wherein, in use, when the electrically powered light source stops emitting light, light from the photo-excited intermediate translucent photo-luminescent layer is transmitted partially through the outer indicator layer to be visible from the exterior of the hybrid illuminated indicator sign.

In accordance with another aspect of the present invention there is disclosed a novel hybrid illuminated indicator sign for visually displaying indicators when the hybrid illuminated indicator sign is electrically powered and for at least a period of time when the hybrid illuminated indicator sign is no longer electrically powered. The hybrid illuminated indicator sign comprises a light guide plate having a light receiving edge and a light emitting face; an intermediate translucent photo-luminescent layer at least partially covering the light emitting face of the light guide plate; a frame substantially surrounding the light guide plate and the translucent photo-luminescent board; an outer indicator layer at least partially covering the intermediate translucent photo-luminescent layer and secured to the frame; and, an electrically powered light source mounted within the frame adjacent the light receiving edge of the light guide plate.

In accordance with another aspect of the present invention there is disclosed a novel hybrid illuminated indicator sign for visually displaying indicators when the hybrid illuminated indicator sign is electrically powered and for at least a period of time when the hybrid illuminated indicator sign is no longer electrically powered. The hybrid illuminated indicator sign comprises a light guide plate having a light receiving edge and a light emitting face; an intermediate translucent photo-luminescent layer juxtaposed the light emitting face of the light guide plate; an outer indicator layer juxtaposed the intermediate translucent photo-luminescent layer; and an electrically powered light source mounted adjacent the light receiving edge of the light guide plate.

In accordance with another aspect of the present invention there is disclosed a novel hybrid illuminated indicator sign for visually displaying indicators when the hybrid illuminated indicator sign is electrically powered and for at least a period of time when the hybrid illuminated indicator sign is no longer electrically powered. The hybrid illuminated indicator sign comprises a light guide plate having a light receiving edge and a light emitting face; an outer indicator layer at least partially covering the light emitting face of the illuminated indicator sign; an electrically powered light source mounted adjacent the light receiving edge of the light guide plate; and a photo-luminescent member mounted adjacent the light receiving edge of the light guide plate and in light receiving relation with respect to the electrically powered light source. In use, when the electrically powered light source is emitting light, the emitted light enters the light guide plate through the light receiving edge and is re-directed partially through the outer indicator layer to be visible from the exterior of the hybrid illuminated indicator sign, and the emitted light is received by the photo-luminescent member to thereby cause photo-excitation thereof; and, wherein, in use, when the electrically powered light source stops emitting light, light from the photo-excited photo-luminescent member enters the light guide plate through the light receiving edge and is re-directed partially through the outer indicator layer to be visible from the exterior of the hybrid illuminated indicator sign.

In accordance with yet another aspect of the present invention there is disclosed a novel mounting apparatus for mounting the hybrid illuminated indicator sign on a structure. The mounting apparatus comprising a structure-engaging plate; a canopy securable to the structure-engaging plate; at least one canopy mounting post extending downwardly from the structure-engaging plate, and for each canopy mounting post, a threaded fastener extending through a co-operating aperture in the canopy and threadibly engaging a co-operating canopy mounting post; and at least one sign mounting post extending downwardly from the structure-engaging plate, and wherein each sign mounting post has a head portion and a reduced neck portion, and the frame has a key hole slot for each sign mounting post and wherein the reduced neck portion of the sign mounting post engages the key hole slot.

In accordance with yet another aspect of the present invention there is disclosed a novel hybrid illuminated indicator sign for visually displaying indicators when the hybrid illuminated indicator sign is electrically powered and for at least a period of time when the hybrid illuminated indicator sign is no longer electrically powered. The hybrid illuminated indicator sign comprises a light guide plate having a light receiving edge and a light emitting face; a translucent photo-luminescent portion at least partially covering the light emitting face of the light guide plate; an indicator portion at least partially covering the light emitting face of the light guide plate; and an electrically powered light source mounted adjacent the light receiving edge of the light guide plate. In use, when the electrically powered light source is emitting light, the emitted light enters the light guide plate through the light receiving edge and is re-directed to the photo-luminescent portion to thereby cause photo-excitation thereof, and wherein light from the photo-luminescent portion is re-emitted at least partially past the outer indicator portion to be visible from the exterior of the hybrid illuminated indicator sign. Also in use, when the electrically powered light source stops emitting light, light from the photo-luminescent portion is re-emitted at least partially past the outer indicator portion to be visible from the exterior of the hybrid illuminated indicator sign.

In accordance with yet another aspect of the present invention there is disclosed a novel mounting apparatus for mounting the hybrid illuminated indicator sign on a structure. The mounting apparatus comprises a structure-engaging plate; a bayonet mounting bracket; a canopy securable to the bayonet mounting bracket; a housing; an internal mounting bracket within the housing; and at least one threaded fastener extending through a co-operating aperture in the canopy and through a co-operating aperture in the internal mounting bracket for threaded engagement by a co-operating threaded fastener.

In accordance with yet another aspect of the present invention there is disclosed a novel hybrid illuminated indicator sign system comprises a first hybrid illuminated indicator sign and a second hybrid illuminated indicator sign, and an electrical power controller circuit having a first power output connected in power supplying relation to the first hybrid illuminated indicator sign and a second power output connected in power supplying relation to the second hybrid illuminated indicator sign. The electrical power controller circuit is operable to provide electrical power from the power outputs in a power cycle that comprises a first power sub-cycle and a second power sub-cycle such that, during the first power sub-cycle, the first hybrid illuminated indicator sign is on and the second hybrid illuminated indicator sign is off, and during the second power sub-cycle, the second hybrid illuminated indicator sign is on and the first hybrid illuminated indicator sign is off.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of The hybrid illuminated indicator sign according to the present invention, as to its structure, organization, use and method of operation, together with further objectives and advantages thereof, will be better understood from the following drawings in which a presently known embodiment of the invention will now be illustrated by way of example. It is expressly understood, however, that the drawings are for the purpose of illustration and description only, and are not intended as a definition of the limits of the invention. In the accompanying drawings:

FIG. 3 is a front elevational view of the first illustrated embodiment of the hybrid illuminated indicator sign of FIG. 1;

FIG. 4 is a sectional end elevational view of the first illustrated embodiment of the hybrid illuminated indicator sign of FIG. 1, taken along section line 4-4 in FIG. 3;

FIG. 5 is an end elevational view of the light strip holder used in the first illustrated embodiment of the hybrid illuminated indicator sign of FIG. 1;

FIG. 6 is a sectional side elevational view of the first illustrated embodiment of the hybrid illuminated indicator sign of FIG. 1, taken along section line 6-6 in FIG. 4;

FIG. 8 is an exploded perspective view of the third illustrated embodiment of the hybrid illuminated indicator sign, according to the present invention;

FIG. 9 is a front elevational view of the third illustrated embodiment of the hybrid illuminated indicator sign of FIG. 8;

FIG. 10 is an end elevational view of the third illustrated embodiment of the hybrid illuminated indicator sign of FIG. 8;

FIG. 11 is a sectional end elevational view of the third illustrated embodiment of the hybrid illuminated indicator sign of FIG. 8, taken along section line 11-11 in FIG. 9;

FIG. 12 is a sectional end elevational view of the third illustrated embodiment of the hybrid illuminated indicator sign of FIG. 8, taken along section line 12-12 in FIG. 9;

DETAILED DESCRIPTION OF THE ILLUSTRATED EMBODIMENT

Figure 1:
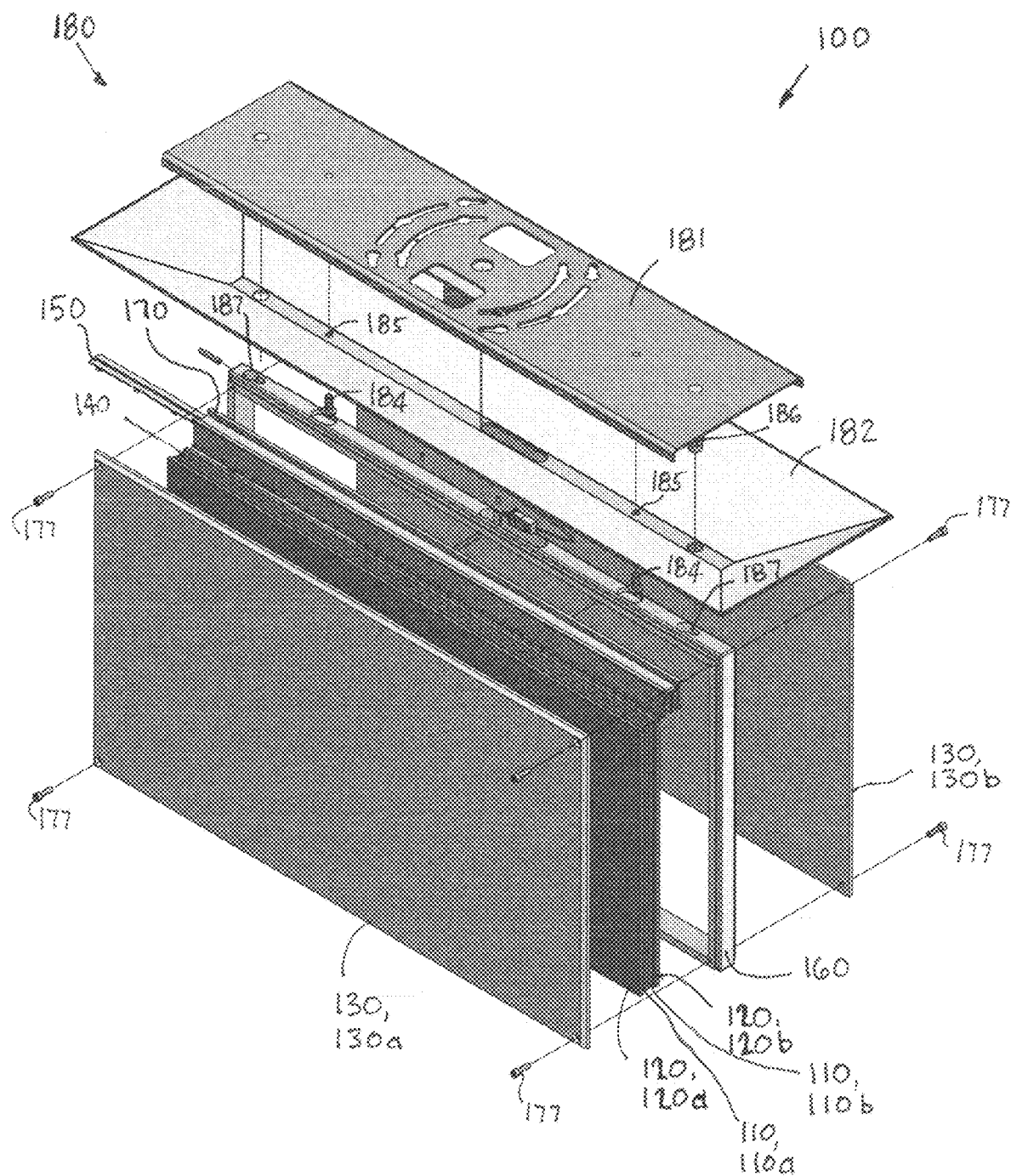
FIG. 1 is an exploded perspective view of the first illustrated embodiment of the hybrid illuminated indicator sign, according to the present invention, with the white reflective layer, the first and second light guides and the first and second intermediate translucent photo-luminescent layers are juxtaposed one another.
Figure 2:
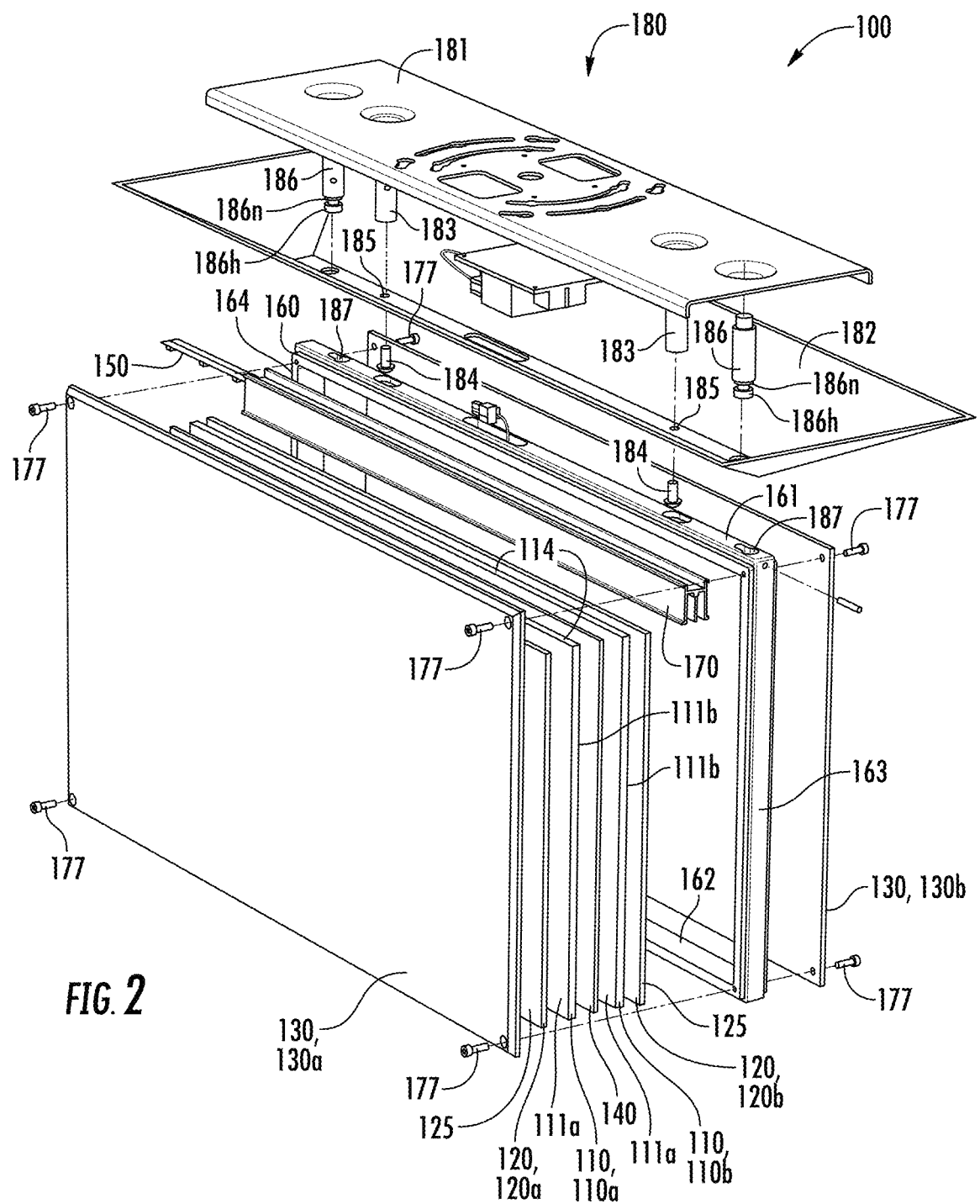
FIG. 2 is an exploded perspective view of the first illustrated embodiment of the hybrid illuminated indicator sign of FIG. 1, but with the white reflective layer, the first and second light guides and the first and second intermediate translucent photo-luminescent layers separated one another for the sake of clarity.
Figure 7:
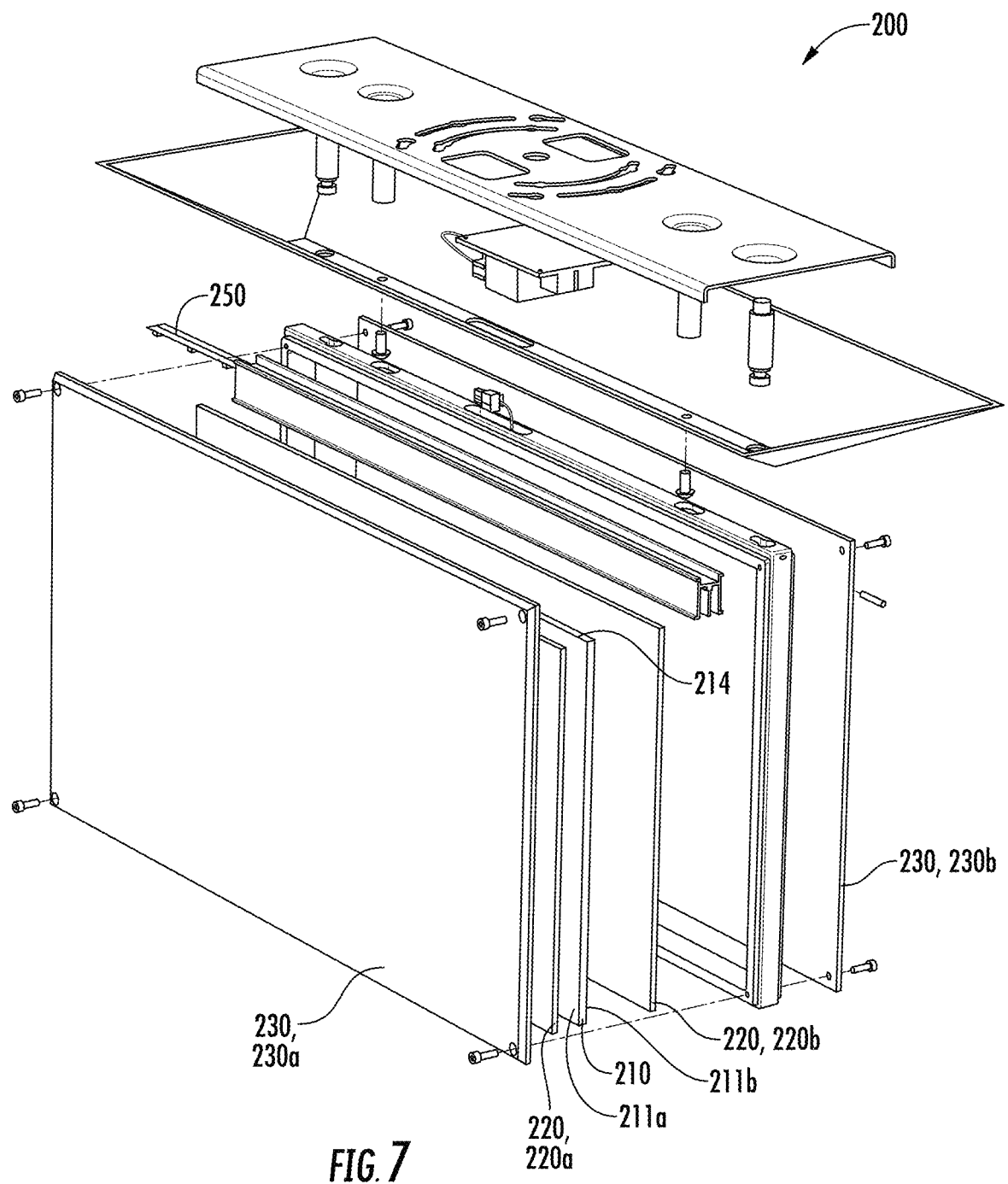
FIG. 7 is an exploded perspective view of the second illustrated embodiment of the hybrid illuminated indicator sign, according to the present invention.
Figure 13:
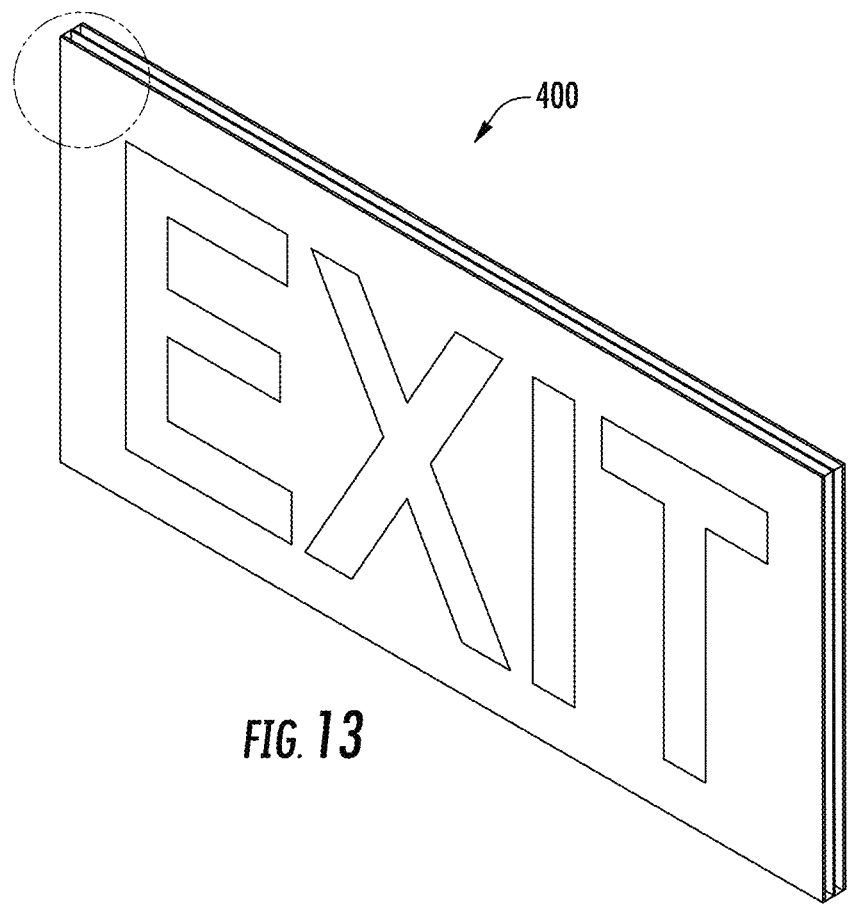
FIG. 13 is a perspective view of the fourth illustrated embodiment of the hybrid illuminated indicator sign, according to the present invention.
Figure 14:
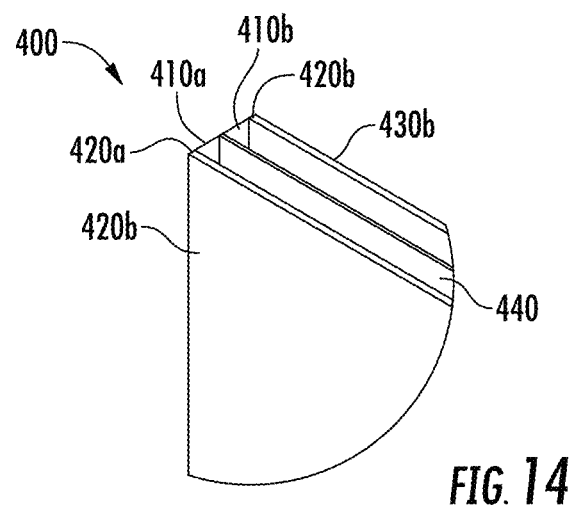
FIG. 14 is an enlarged perspective view of a portion of the fourth illustrated embodiment of the hybrid illuminated indicator sign of FIG. 13.
Figure 15:
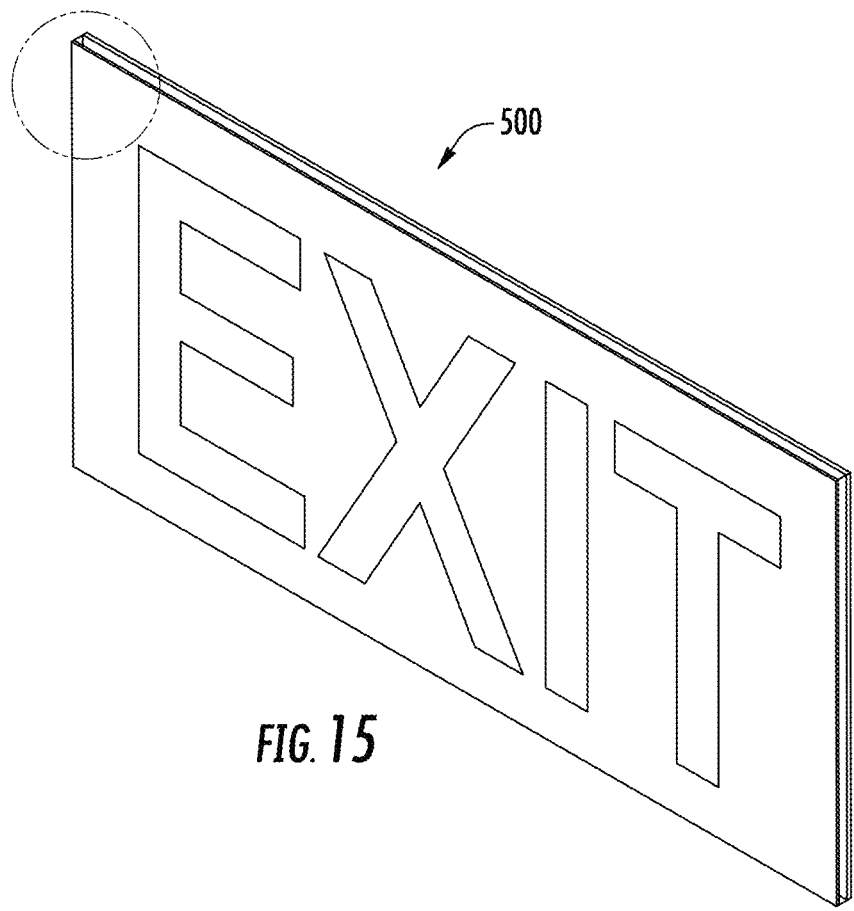
FIG. 15 is a perspective view of the fifth illustrated embodiment of the hybrid illuminated indicator sign, according to the present invention.
Figure 16:
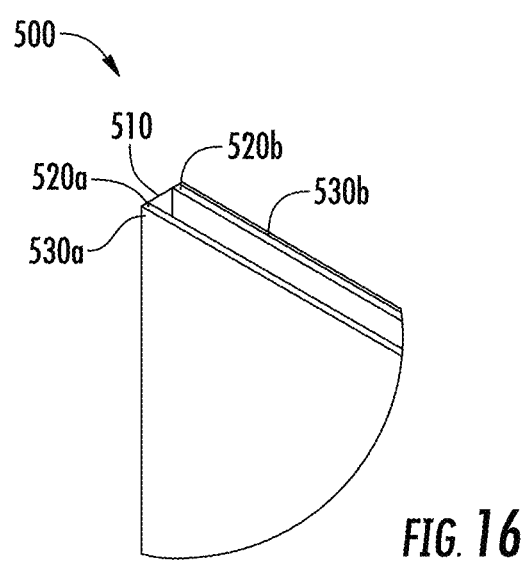
FIG. 16 is an enlarged perspective view of a portion of the fifth illustrated embodiment of the hybrid illuminated indicator sign of FIG. 15.
Figure 17:
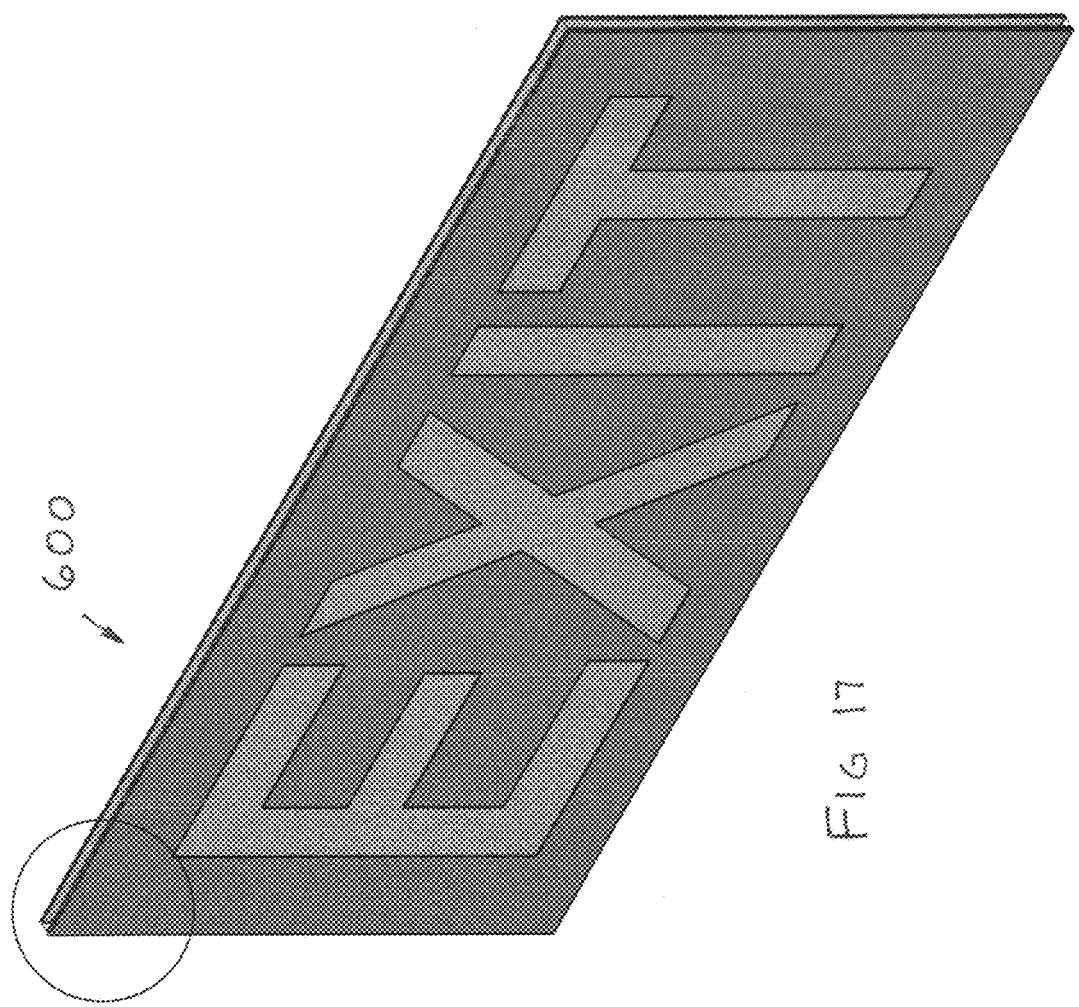
FIG. 17 is a perspective view of the sixth illustrated embodiment of the hybrid illuminated indicator sign, according to the present invention.
Figure 18:
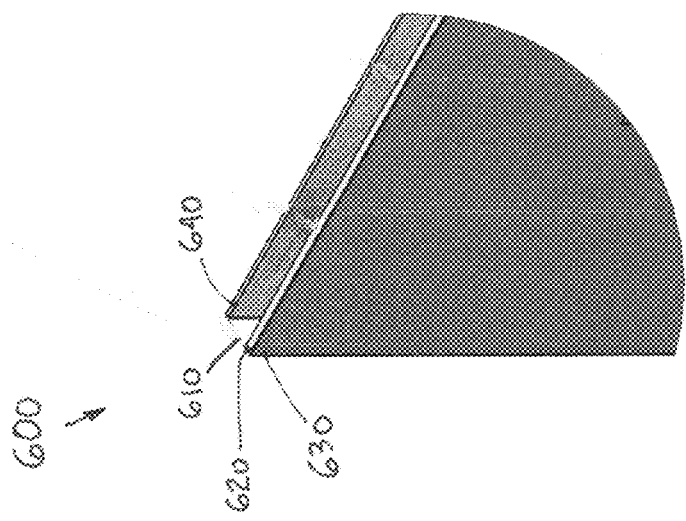
FIG. 18 is an enlarged perspective view of a portion of the sixth illustrated embodiment of the hybrid illuminated indicator sign of FIG. 17.
Figure 19:
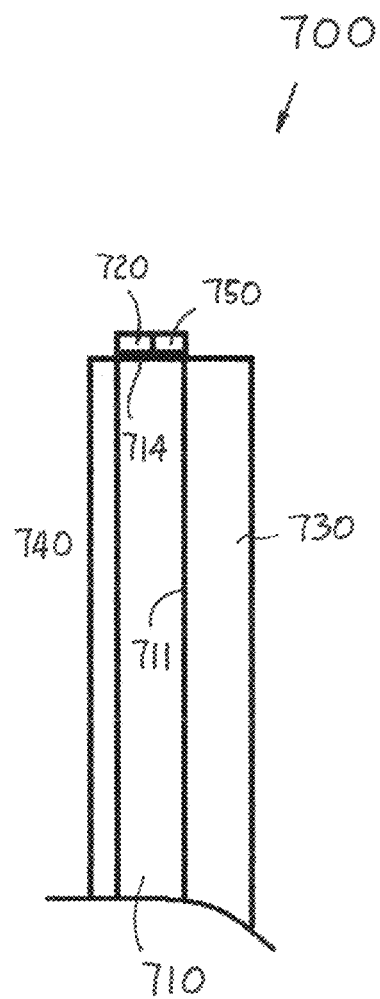
FIG. 19 is a side elevational view of the seventh illustrated embodiment of the hybrid illuminated indicator sign, according to the present invention.
Figure 20:
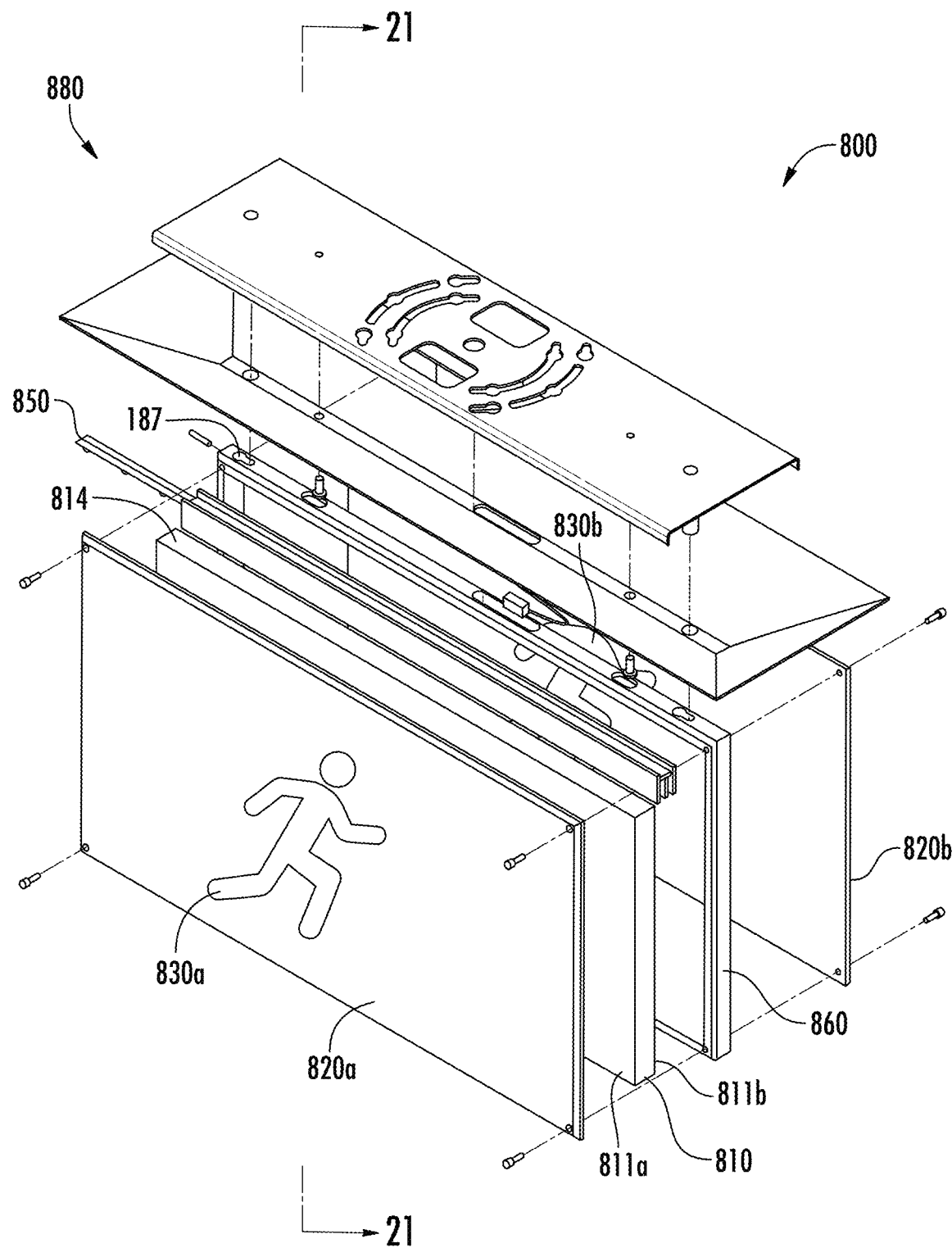
FIG. 20 is an exploded perspective view of the eighth illustrated embodiment of the hybrid illuminated indicator sign, according to the present invention.
Figure 21:
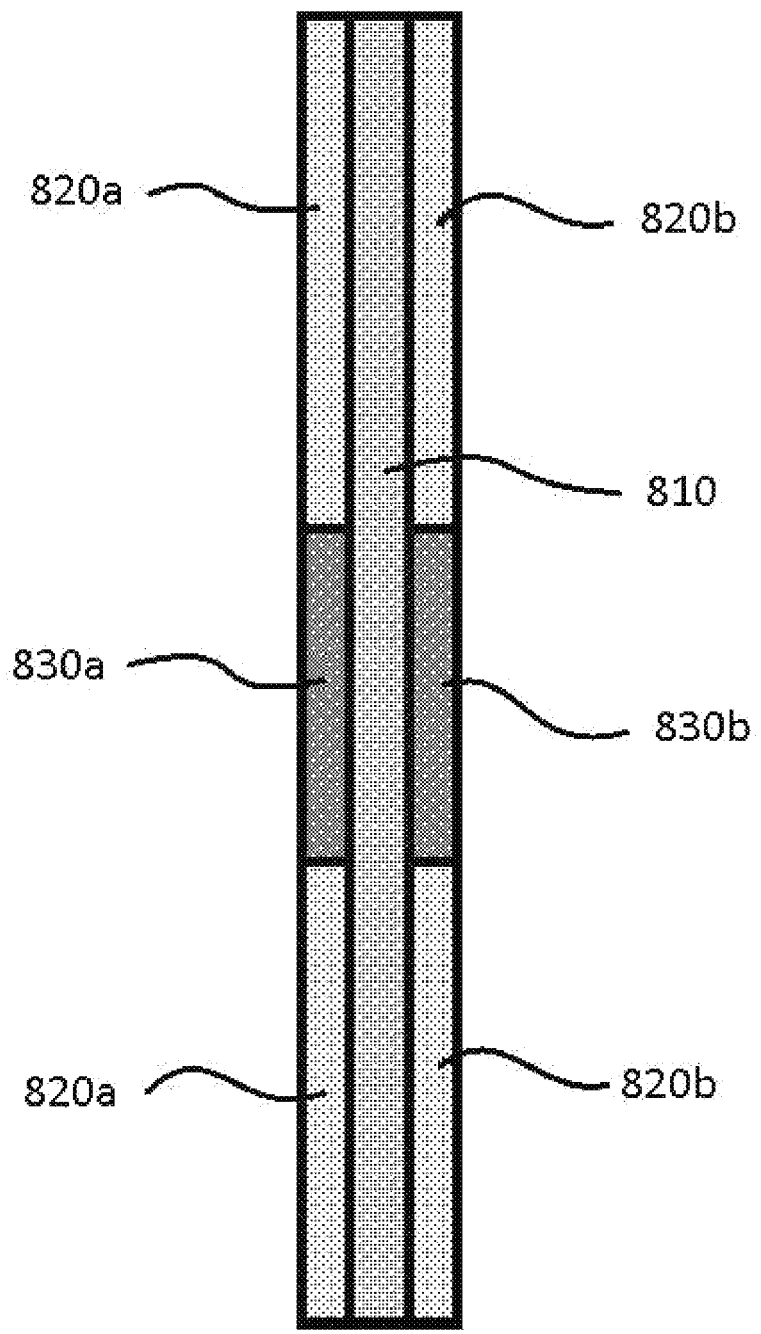
FIG. 21 is a cross-sectional end elevational view of the eighth illustrated embodiment of the hybrid illuminated indicator sign as shown on FIG. 20, taken along section line 22-22 in FIG. 20.
Figure 22:
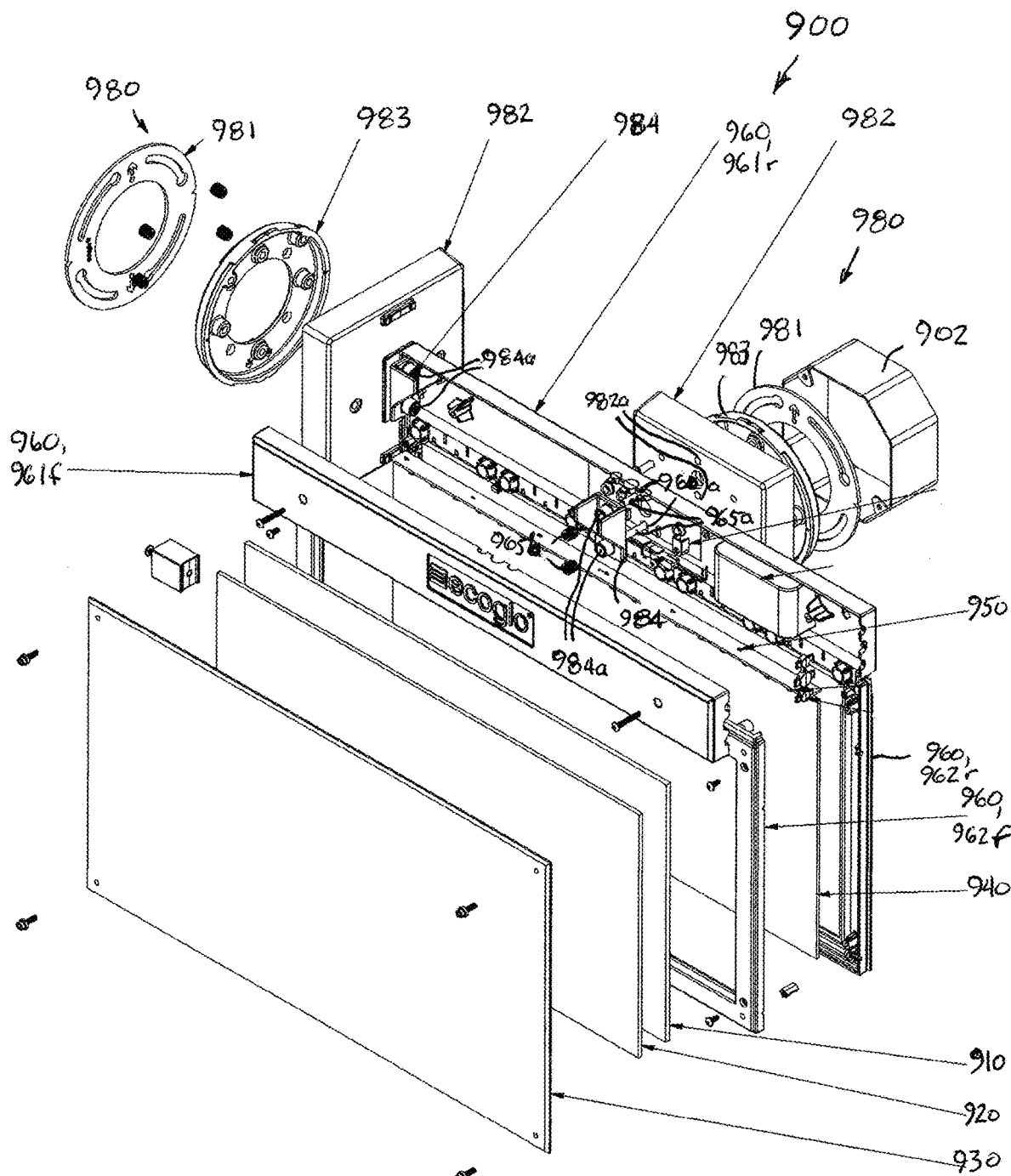
FIG. 22 is a perspective view of the ninth illustrated embodiment of the hybrid illuminated indicator sign, according to the present invention; and, FIG. 23 is a diagrammatic top plan view of a building having a plurality of hybrid illuminated indicator signs according to the present invention installed therein.
Figure 23:
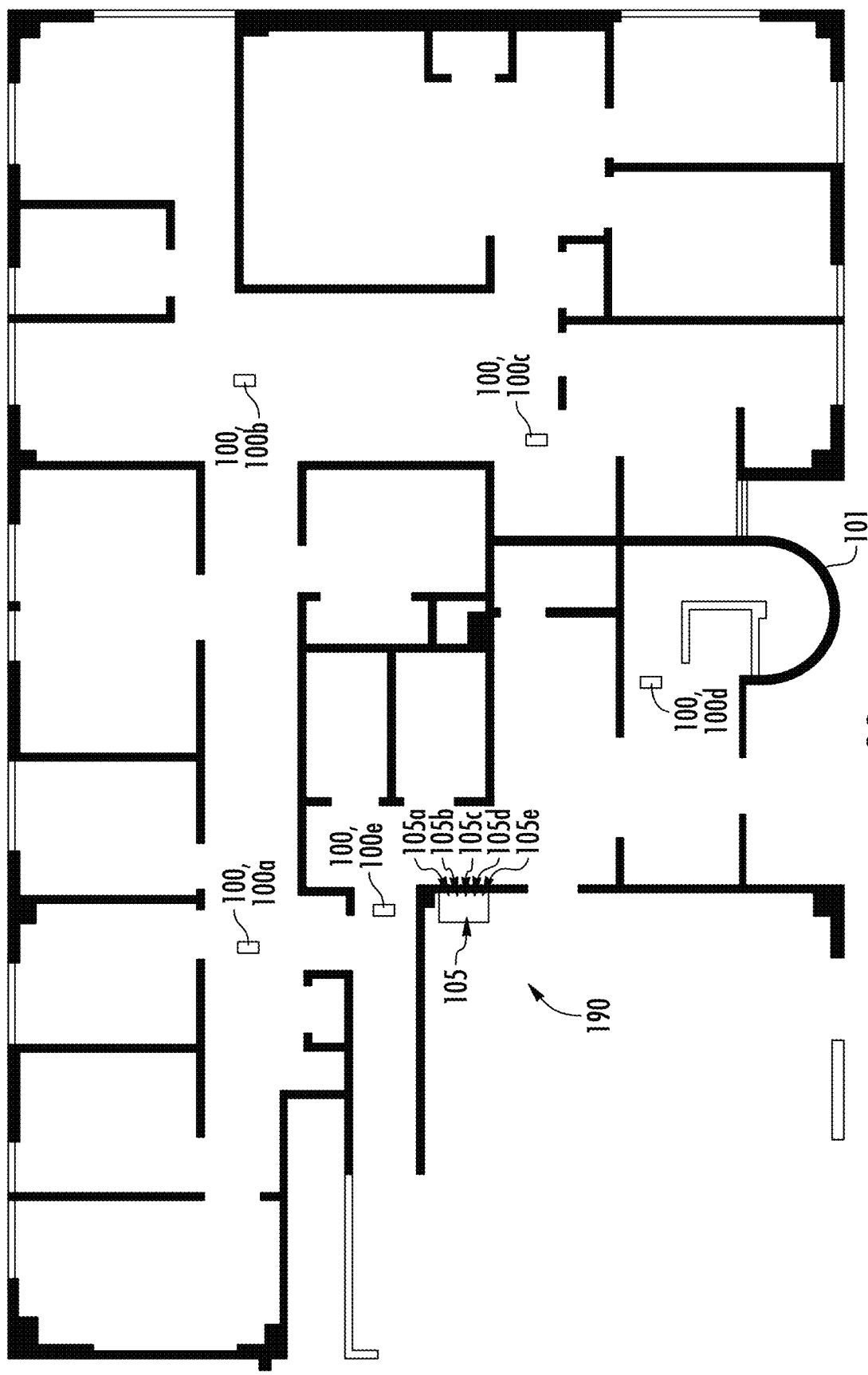

Referring to FIGS. 1 through 23 of the drawings, it will be noted that FIGS. 1 through 6 show a first illustrated embodiment of the hybrid illuminated indicator sign according to the present invention, FIG. 7 shows a second illustrated embodiment of the hybrid illuminated indicator sign according to the present invention, FIGS. 8 through 12 show a third illustrated embodiment of the hybrid illuminated indicator sign according to the present invention, FIGS. 13 and 14 show a fourth illustrated embodiment of the hybrid illuminated indicator sign according to the present invention, FIGS. 15 and 16 show a fifth illustrated embodiment of the hybrid illuminated indicator sign according to the present invention, FIGS. 17 and 18 show a sixth illustrated embodiment of the hybrid illuminated indicator sign according to the present invention, FIG. 19 shows a seventh illustrated embodiment of the hybrid illuminated indicator sign according to the present invention, FIGS. 20 and 21 show an eighth illustrated embodiment of the hybrid illuminated indicator sign according to the present invention, FIG. 22 shows an ninth illustrated embodiment of the hybrid illuminated indicator sign according to the present invention, and FIG. 23 shows an installation in a building of the hybrid illuminated indicator sign according to the present invention and applies to all of the above embodiments.

The present invention is a hybrid illuminated indicator sign, as indicated by the general reference numeral 100, for visually displaying indicators when the hybrid illuminated indicator sign 100 is electrically powered and for at least a period of time when the hybrid illuminated indicator sign 100 is no longer electrically powered. Typically, the hybrid illuminated indicator sign 100 would be used in building to indicate a point of exit from the building, such as an exit door or exit corridor, and may also be used to indicate intermediate corridors, such as to stairways, and so on. The first illustrated embodiment and the second illustrated embodiment specifically show embodiments of the present invention that are configured for mounting on a structure such as a ceiling, or the like. The third illustrated embodiment is configured for mounting on a structure such as a wall, or the like. It should be understood that any of the embodiments of the hybrid illuminated indicator sign 100 according to the present invention can be mounted on any suitable surface or any suitable retaining structure 160 by an appropriate mounting apparatus 180.

Reference will now be made to FIGS. 1 through 6, which show a first illustrated embodiment of the hybrid illuminated indicator sign 100 according to the present invention.

In brief, the first illustrated embodiment hybrid illuminated indicator sign 100 comprises a light guide plate 110, an intermediate translucent photo-luminescent layer 120, an outer indicator layer 130, a reflective layer 140, an electrically powered light source 150, a retaining structure 160, an elongate light strip holder 170 and a mounting apparatus 180.

More specifically, the light guide plate 110 comprises a first light guide plate 110a, and the first illustrated embodiment hybrid illuminated indicator sign 100 further comprises second light guide plate 110b. The first light guide plate 110a has a light receiving edge 114, a first light emitting face 111a and a second light emitting face 111b. Similarly, the second light guide plate 110b has a light receiving edge 114, a first light emitting face 111a and a second light emitting face 111b. The light receiving edges 114a, 114b of the first and second light guide plates 110a, 110b are disposed at the top edge of the first and second light guide plates 110a, 110b, respectively, and are juxtaposed each other so as to receive light from the electrically powered light source 150. As can be readily seen in the Figures, the first light guide plate 110a and the second light guide plate 110b are substantially juxtaposed one to the other and the first light emitting face 111a of the first light guide plate 110a and the first light emitting face 111a of the second light guide plate 110b face in substantially opposite directions one from the other. Further, for each light guide plate 110, the second light emitting face 111b of each light guide plate 110 is disposed in oppositely facing relation to the first light emitting face 111a.

It has been found that having the first light guide plate 110a and the second light guide plate 110b between about 2.0 millimeters and about 5.0 millimeters in thickness works well. Any suitable thickness of light guide plate 110 can be used.

The reflective layer 140 is disposed between the first light guide plate 110a and the second light guide plate 110b. The reflective layer 140 at least partially covers, and preferably fully covers, the second light emitting face 111b of the first light guide plate 110a and the second light emitting face 111b of the second light guide plate 110b. Preferably, the reflective layer 140 comprises a thin reflective board 140 and is generally white in color to maximize its opaque reflection characteristics. As will be better understood subsequently, the reflective layer 140 reflects light emitted from the second light emitting face 111b of the first light guide plate 110a and the second light emitting face 111b of the second light guide plate 110b, back generally evenly into and through the first light guide plate 110a and the second light guide plate 110b, respectively.

The hybrid illuminated indicator sign 100 also comprises the electrically powered light source 150 mounted adjacent the light receiving edge 114 of the light guide plate 110. As illustrated, the electrically powered light source 150 comprises a first LED light strip 150a and a second LED light strip 150b. As illustrated, but not necessarily, each of the first light guide plate 110a and the second light guide plate 110b has a thickness approximately equal to the width of the respective one of the LED light strip and the second LED light strip 150b. It has also been found that the first light guide plate 110a and the second light guide plate 110b can have a thickness slightly greater than the width of the respective one of the LED light strip 150a and the second LED light strip 150b.

In the first illustrated embodiment, the intermediate translucent photo-luminescent layer 120 comprises a first intermediate translucent photo-luminescent layer 120a and there is also a second intermediate translucent photo-luminescent layer 120b. Preferably, the first intermediate translucent photo-luminescent layer 120a comprises a first intermediate translucent photo-luminescent board 120a and the second intermediate translucent photo-luminescent layer 120b comprises a second intermediate translucent photo-luminescent board 120b. Preferably, the first intermediate translucent photo-luminescent board 120a and the second intermediate translucent photo-luminescent board 120b each are between about 1.0 millimeters and about 3.0 millimeters in thickness.

The first intermediate translucent photo-luminescent layer 120a at least partially covers the first light emitting face 111a of the first light guide plate 110a and in the first illustrated embodiment covers substantially the entire first light emitting face 111a of the first light guide plate 110a. Similarly, the second intermediate translucent photo-luminescent layer 120b at least partially covers the first light emitting face 111a of the second light guide plate 110b, and in the first illustrated embodiment covers substantially the entire first light emitting face 111a of the second light guide plate 110b.

There is also a heat resistant clear coating 125 on each of the first intermediate translucent photo-luminescent layer 120a and the second intermediate translucent photo-luminescent layer 120b. The heat resistant clear coating 125 preferably comprises a UV protectant with a polymer base. It has been found that the heat resistant clear coating 125 ameliorates the problem of having the photo-luminescent mixture in the first light guide plate 110a and the second light guide plate 110b bond to the respective light guide plate 110 and/or outer indicator layer 130, which tended to create uneven transmission of light through the intermediate translucent photo-luminescent layers 120.

The outer indicator layer 130 comprises a first outer indicator layer 130a, and there is also a second outer indicator layer 130b. The first outer indicator layer 130a at least partially covers the intermediate translucent photo-luminescent layer 120, and the second outer indicator layer 130b at least partially covering the second intermediate translucent photo-luminescent layer 120b. In the first illustrated embodiment, the first outer indicator layer 130a comprises a first outer indicator board 130a and the second outer indicator layer 130b comprises a second outer indicator board 130b. The first outer indicator board 130a and the second outer indicator board 130b are between about 0.01 millimeters and about 5.0 millimeters in thickness. As can be readily seen in the Figures, each of the first outer indicator board 130a and the second outer indicator board 130b are configured in shape to convey a message by way of alphanumeric characters, such as perhaps the word EXIT, or to convey a message by way symbols, such as a person walking or running, and/or an arrow.

It is also contemplated that the first outer indicator layer 130a the second outer indicator layer 130b may be in the form of a board, as discussed above, or may be a film or a coating, or similar, as long as the first outer indicator layer 130a the second outer indicator layer 130b sufficiently block light.

The first illustrated embodiment hybrid illuminated indicator sign 100 further comprises a retaining structure 160 for retaining together the first intermediate translucent photo-luminescent layer 120a, the first light guide plate 110a, the reflective layer 140, the second intermediate translucent photo-luminescent layer 120b, and the first light guide plate 110a.

The reflective layer 140 is retained by the retaining structure 160 adjacent and in between the first light guide plate 110a and the second light guide plate 110b, opposite the intermediate translucent photo-luminescent layers 120a, 120b.

The elongate light strip holder 170 is retained by the retaining structure 160 adjacent the light receiving edge 114 of the first light guide plate 110a and adjacent the light receiving edge 114 of the first light guide plate 110b.

The elongate light strip holder 170 comprises a central vertical flange 174, a first outer vertical flange 171, a second outer vertical flange 172, and a horizontal web 173 interconnecting the central vertical flange 174, the first outer vertical flange 171 and the second outer vertical flange 172 in spaced relation one from the other.

It can therefore be seen that the elongate light strip holder 170a retains and properly situates the first LED light strip 150a immediately above the light receiving edge 114 of the first light guide plate 110a, such that the light emitted by the first LED light strip 150a shines downwardly directly into the first light guide plate 110a, and retains and properly situates the second LED light strip 150b immediately above the light receiving edge 114 of the second light guide plate 110b, such that the light emitted by the second LED light strip 150b shines downwardly directly into the second light guide plate 110b.

In this manner, the electrically powered light source 150, and more specifically, the first LED light strip 150a and the second LED light strip 150b are retained in place by the retaining structure 160.

The electrically powered light source 150 is mounted within the elongate light strip holder, underneath the horizontal web 173 of the elongate light strip holder 170. More specifically, the elongate light strip holder 170 comprises a first pair of opposed horizontal support flanges 175 projecting one from each of the inner surface of the first outer vertical flange 171 and the opposed surface of the central vertical flange 174, below the horizontal web 173, and a second pair of opposed horizontal support flanges 176 projecting one from each of the inner surface of the second outer vertical flange 172 and the opposed surface of the central vertical flange 174, below the horizontal web 173. The electrically powered light source 150 comprises a first LED light strip 150a supported by the first pair of opposed horizontal support flanges 175 and a second LED light strip 150b supported by the second pair of opposed horizontal support flanges 176.

In the first illustrated embodiment, the retaining structure 160 comprises a frame 160 having a top portion 161, a bottom portion 162, first end portion 163 and a second end portion 164 secured together one to another. Further, the light receiving edge 114 of the first light guide plate 110a is disposed near the top of the first light guide plate 110a and the light receiving edge 114 of the second light guide plate 110b is disposed near the top of the second light guide plate 110b. Accordingly, the light receiving edge 114 of the first light guide plate 110a and the light receiving edge 114 of the second light guide plate 110b are disposed near the top of the frame 160. As can be readily seen, the frame 160 substantially surrounds the first light guide plate 110a and the second light guide plate 110b, and also surrounds the first translucent photo-luminescent board 120a and the second translucent photo-luminescent board 120b, and also surrounds the reflective board 140. In order to accomplish this, the first light guide plate 110a, the second light guide plate 110b, the first translucent photo-luminescent board 120a, the second translucent photo-luminescent board 120b and the reflective board 140 are approximately the same height and width one as the other.

The inner-facing surfaces of the frame 160 may be highly reflective in color in order to reflect light emitted from the outer edges the first guide plate 110a, the second light guide plate 110b, the first translucent photo-luminescent board 120a and the second translucent photo-luminescent board 120b back to the first guide plate 110a, the second light guide plate 110b, the first translucent photo-luminescent board and the second translucent photo-luminescent board 120b. It has been found that white, silver and mirrored surfaces may work well.

Further, the bottom edge 114c and the side edges 114d of the first light guide plate 110a, and the bottom edge 114e and the side edges 114f of the second light guide plate 110a, may have a reflective coating or similar thereon, such as a white colored paint, in order to reflect light back into the first light guide plate 110a and the second light guide plate 110b, respectively.

As also can be readily seen in the Figures, the electrically powered light source 150, namely the first LED light strip 150a and the second LED light strip 150b, are mounted at the top portion 161 of the frame 160.

It can also be readily seen in the Figures, that the first outer indicator board 130a and the second outer indicator board 130b are the same height and width one as the other, and are slightly greater in height and width than are the first light guide plate 110a, the second light guide plate 110b, the first translucent photo-luminescent board 120a, the second translucent photo-luminescent board 120b, and the reflective board 140. Accordingly, a plurality of threaded fasteners 177 are used to securely engage the first outer indicator layer 130a and the second outer indicator layer 130b to the frame 160.

There is also a mounting apparatus 180 for mounting the hybrid illuminated indicator sign 100 on a structure, such as a ceiling, a wall, or the like, as discussed above. The mounting apparatus 180 comprises a structure-engaging plate 181 and a canopy 182 securable to the structure-engaging plate 181. There is at least one canopy mounting post 183 extending downwardly from the structure-engaging plate 181. For each canopy mounting post 183, there is a threaded fastener 184 extending through a co-operating aperture 185 in the canopy 182 and threadibly engaging a co-operating canopy mounting post 183. There is also at least one sign mounting post 186 extending downwardly from the structure-engaging plate 181. Each sign mounting post 186 has a head portion 186h and a reduced neck portion 186n, and the frame 160 has a key hole slot 187 for each sign mounting post 186 and wherein the reduced neck portion 186n of the sign mounting post 186 engages the key hole slot 187.

In use, when the first LED light strip 150a is emitting light, the emitted light enters the first light guide plate 110a through the light receiving edge 114 and is re-directed out of the first light guide plate 110a through the first light emitting face 111a of the first light guide plate 110a. Light is also re-directed through the second light emitting face 111b to the reflective layer 140, whereat the light reflects off the reflective layer 140 and travels back through the first light guide plate 110a and out of the first light guide plate 110a of the first light guide plate 110a. The light is emitted from the first light guide plate 110a through the first light emitting face 111a to the first intermediate translucent photo-luminescent layer 120a to thereby cause photo-excitation thereof, partially through the first intermediate translucent photo-luminescent layer 120a to the first outer indicator layer 130a, and partially through the first outer indicator layer 130a to be visible from the exterior of the hybrid illuminated indicator sign 100. Also, when the second LED light strip 150b is emitting light, the emitted light enters the second light guide plate 110b through the light receiving edge 114 and is re-directed out of the second light guide plate 110b through the first light emitting face 111a the second light guide plate 110b. Light is also re-directed through the second light emitting face 111b to the reflective layer 140, whereat the light reflects off the reflective layer 140 and travels back through the second light guide plate 110b and out of the second light guide plate 110b. The light is then emitted from the second light guide plate 110b through the first light emitting face 111a of the second light guide plate 110a to the second intermediate translucent photo-luminescent layer 120b to thereby cause photo-excitation thereof, partially through the second intermediate translucent photo-luminescent layer 120b to the second outer indicator layer 130b, and partially through the second outer indicator layer 130b to be visible from the exterior of the hybrid illuminated indicator sign 100.

When the electrically powered light source 150 stops emitting light, light from the photo-excited first intermediate translucent photo-luminescent layer 120a is transmitted partially through the first outer indicator layer 130a to be visible from the exterior of the hybrid illuminated indicator sign 100. Further, light from the photo-excited second intermediate translucent photo-luminescent layer 120b is transmitted partially through the second outer indicator layer 130b to be visible from the exterior of the hybrid illuminated indicator sign 100.

It can therefore be readily seen that the first illustrated embodiment hybrid illuminated indicator sign 100 is a bi-directional indicator sign.

In another aspect, the present invention is a hybrid illuminated indicator sign 100 for visually displaying indicators when the hybrid illuminated indicator sign 100 is electrically powered and for at least a period of time when the hybrid illuminated indicator sign 100 is no longer electrically powered. The hybrid illuminated indicator sign 100 comprises the light guide plate 110 having the light receiving edge 114 and the light emitting face 111. The intermediate translucent photo-luminescent layer 120 at least partially covers the light emitting face 111 of the light guide plate 110. The frame substantially surrounds the light guide plate 110 and the translucent photo-luminescent board 120. The outer indicator layer 130 at least partially covers the intermediate translucent photo-luminescent layer 120 and secured to the frame 160. The electrically powered light source 150 is mounted within the frame 160 adjacent the light receiving edge 114 of the light guide plate 110. The outer indicator layer 130 is secured mounted in removable and replaceable relation to the frame 160.

In another aspect, the present invention is a hybrid illuminated indicator sign 100 for visually displaying indicators when the hybrid illuminated indicator sign 100 is electrically powered and for at least a period of time when the hybrid illuminated indicator sign 100 is no longer electrically powered. The hybrid illuminated indicator sign 100 comprises the light guide plate 110 having the light receiving edge 114 and the light emitting face 111. The intermediate translucent photo-luminescent layer 120 is juxtaposed the light emitting face 111 of the light guide plate 110. The outer indicator layer 130 is juxtaposed the intermediate translucent photo-luminescent layer 120. The electrically powered light source 150 is mounted adjacent the light receiving edge 114 of the light guide plate 110.

In another aspect, the present invention is a mounting apparatus 180 for mounting the hybrid illuminated indicator sign 100 on a structure. The mounting apparatus 180 comprises the structure-engaging plate 181 and the canopy 182 that is securable to the structure-engaging plate 181. The at least one canopy mounting post 183 extends downwardly from the structure-engaging plate 181, and for each canopy mounting post 183, a threaded fastener 184 extends through a co-operating aperture 185 in the canopy 182 and threadibly engaging a co-operating canopy mounting post 183. The at least one sign mounting post 186 extends downwardly from the structure-engaging plate 181. Each sign mounting post 186 has a head portion 186h and a reduced neck portion 186n, and the frame 160 has a key hole slot 187 for each sign mounting post 186. The reduced neck portion 186n of the sign mounting post 186 engages the key hole slot 187.

Reference will now be made to FIG. 7, which shows a second illustrated embodiment hybrid illuminated indicator sign according to the present invention, as indicated by the general reference numeral 200. The second illustrated embodiment hybrid illuminated indicator sign 200 is similar to the first illustrated embodiment hybrid illuminated indicator sign 100, except that there is only one light guide plate 210 and there is no reflective layer. The light guide plate 210 has a light receiving edge 214 disposed at the top edge of the light guide plate 110, and a first light emitting face 211a and a second light emitting face 211b. The intermediate translucent photo-luminescent layer 220 comprises a first intermediate translucent photo-luminescent layer 220a at least partially covering the first light emitting face 211a of the light guide plate 210, and the outer indicator layer 230 comprises a first outer indicator layer 230a at least partially covering the first intermediate translucent photo-luminescent layer 220a. The hybrid illuminated indicator sign 200 further comprises a second intermediate translucent photo-luminescent layer 220b at least partially covering the second light emitting face 211b of the light guide plate 210, and a second outer indicator layer 230b at least partially covering the second intermediate translucent photo-luminescent layer 220b. Also, there is only one electrically powered light source 250.

In use, when the electrically powered light source 250 is emitting light, the emitted light enters the light guide plate 210 through the light receiving edge 214 and is re-directed to the first intermediate translucent photo-luminescent layer 220a to thereby cause photo-excitation thereof, partially through the first intermediate translucent photo-luminescent layer 220a to the first outer indicator layer 230a, and partially through the first outer indicator layer 230a to be visible from the exterior of the hybrid illuminated indicator sign 200. Also, the emitted light that enters the light guide plate 210 through the light receiving edge 214 is also re-directed to the second intermediate translucent photo-luminescent layer 220b to thereby cause photo-excitation thereof, partially through the second intermediate translucent photo-luminescent layer 220b to the second outer indicator layer 230b, and partially through the second outer indicator layer 230b to be visible from the exterior of the hybrid illuminated indicator sign 200.

Further, in use, when the electrically powered light source 250 stops emitting light, light from the photo-excited first intermediate translucent photo-luminescent layer 220a is transmitted partially through the first outer indicator layer 230a to be visible from the exterior of the hybrid illuminated indicator sign 200. Also, light from the photo-excited second intermediate translucent photo-luminescent layer 220b is transmitted partially through the second outer indicator layer 230b to be visible from the exterior of the hybrid illuminated indicator sign 200.

Reference will now be made to FIGS. 8 through 12 which show a third illustrated embodiment of the hybrid illuminated indicator sign according to the present invention, as indicated by the general reference numeral 300. The third illustrated embodiment hybrid illuminated indicator sign 300 is similar to the first illustrated embodiment hybrid illuminated indicator sign 100 and the second illustrated embodiment hybrid illuminated indicator sign 200, except that there is only one light guide plate 310, one intermediate translucent photo-luminescent layer 320, one outer indicator layer 330, and one electrically powered light source 350. Accordingly, the third illustrated embodiment hybrid illuminated indicator sign 300 is a uni-directional indicator sign.

The light guide plate 310 has a light receiving edge 314, a first light emitting face 311a, and a second light emitting face 311b. The intermediate translucent photo-luminescent layer 320 at least partially covers the light emitting face 311 of the light guide plate 310. The outer indicator layer 330 at least partially covers the intermediate translucent photo-luminescent layer 320. The electrically powered light source 350 is mounted adjacent the light receiving edge 314 of the light guide plate 310. The reflective layer 340 adjacent the second light emitting face 311b of the light guide plate 310, opposite the intermediate translucent photo-luminescent layer 320.

There is also retaining structure 360, namely the frame 360, for retaining together the intermediate translucent photo-luminescent layer 320, the light guide plate 310 and the reflective layer 340. The reflective layer is retained by the retaining structure 360 adjacent the light guide plate 310, opposite the intermediate translucent photo-luminescent layer 320, as aforesaid.

An elongate light strip holder 370 is retained by the retaining structure 360 adjacent the light receiving edge 314 of the light guide plate 310. A illustrated, the elongate light strip holder 370 is the same as the elongate light strip holder 170 in the first illustrated embodiment hybrid illuminated indicator sign 100, and comprises a first outer vertical flange 371 a second outer vertical flange 372, and a horizontal web 373 interconnecting the first outer vertical flange 371 and the second outer vertical flange 372 in spaced relation one from the other. This allows the same elongate light strip holder 370 to be used for a uni-directional indicator sign as for a bi-directional indicator sign.

It can therefore be seen that the elongate light strip holder 370 retains and properly situates the LED light strip 350 immediately above the light receiving edge 314 of the light guide plate 310, such that the light emitted by the LED light strip 350 shines downwardly directly into the light guide plate 310.

In this manner, the electrically powered light source 350 is retained in place by the retaining structure 360.

The electrically powered light source, namely the LED strip 350, is mounted underneath the horizontal web 373 of the elongate light strip holder 370. More specifically, the elongate light strip holder 370 comprises a first pair of opposed horizontal support flanges 375 projecting one from each of the inner surface of the first outer vertical flange 371 and the opposed surface of the central vertical flange 374, below the horizontal web 373, and a second pair of opposed horizontal support flanges 376 projecting one from each of the inner surface of the second outer vertical flange 372 and the opposed surface of the central vertical flange 374, below the horizontal web 373. The LED light strip 350 is supported by the first pair of opposed horizontal support flanges 375.

In the third illustrated embodiment, the retaining structure 360 comprises a frame 360 having a top portion 361, a bottom portion 362, first end portion 363 and a second end portion 364 secured together one to another. Further, the light receiving edge 314 of the light guide plate 310 is disposed near the top of the light guide plate 310. Accordingly, the light receiving edge 314 of the light guide plate 310 is disposed near the top of the frame 360. As can be readily seen, the frame 360 substantially surrounds the light guide plate 310, and also surrounds the translucent photo-luminescent board 320, and also surrounds the reflective board 340. In order to accomplish this, the light guide plate 310, the translucent photo-luminescent board 320 and the reflective board 340 are approximately the same height and width one as the other. There is also a rear enclosure 390 located on the opposite side of the frame to the outer indicator layer 330.

As also can be readily seen in the Figures, the electrically powered light source 350, namely the LED light strip 350 is mounted at the top portion 361 of the frame 360.

It can also be readily seen in the Figures, that the outer indicator board 330 is slightly greater in height and width than are the light guide plate 310, translucent photo-luminescent board 320 and the reflective board 340. Accordingly, a plurality of threaded fasteners 377 are used to securely engage the outer indicator layer 330 to the frame 360 and to the rear enclosure 390.

In use, when the electrically powered light source 350 is emitting light, the emitted light enters the light guide plate 310 through the light receiving edge 314 and is re-directed to the intermediate translucent photo-luminescent layer 320 to thereby cause photo-excitation thereof, partially through the intermediate translucent photo-luminescent layer 320 to the outer indicator layer 330, and partially through the outer indicator layer 330 to be visible from the exterior of the hybrid illuminated indicator sign 300.

Further, in use, when the electrically powered light source 350 stops emitting light, light from the photo-excited intermediate translucent photo-luminescent layer 320 is transmitted partially through the outer indicator layer 330 to be visible from the exterior of the hybrid illuminated indicator sign 300.

Reference will now be made to FIGS. 13 and 14 which show a fourth illustrated embodiment of the hybrid illuminated indicator sign according to the present invention, as indicated by the general reference numeral 400. The fourth illustrated embodiment hybrid illuminated indicator sign 400 is similar to the first illustrated embodiment hybrid illuminated indicator sign 100, except that the first intermediate translucent photo-luminescent layer 420a comprises a coating, the second intermediate translucent photo-luminescent layer 420b comprises a coating, the first outer indicator layer 430a comprises a coating, the second outer indicator layer 430b comprises a coating, and the white reflective layer 440 between the first light guide plate 410a and the second light guide plate 410b comprises a coating.

Reference will now be made to FIGS. 15 and 16 which show a fifth illustrated embodiment of the hybrid illuminated indicator sign according to the present invention, as indicated by the general reference numeral 500. The fifth illustrated embodiment hybrid illuminated indicator sign 500 is similar to the fourth illustrated embodiment hybrid illuminated indicator sign 400, except that there is only one light guide plate 510 disposed between the first intermediate translucent photo-luminescent layer 520a that at least partially covers the first light emitting face 511a and the first outer indicator layer 530a that at least partially covers the first intermediate translucent photo-luminescent layer 520a, and the second intermediate translucent photo-luminescent layer 520b that at least partially covers the second light emitting face 511a and the second outer indicator layer 530a that at least partially covers the first intermediate translucent photo-luminescent layer 520a.

Reference will now be made to FIGS. 17 and 18 which show a sixth illustrated embodiment of the hybrid illuminated indicator sign according to the present invention, as indicated by the general reference numeral 600. The sixth illustrated embodiment hybrid illuminated indicator sign 600 is similar to the fifth illustrated embodiment hybrid illuminated indicator sign 600, except that there is only one light guide plate 610, one intermediate translucent photo-luminescent layer 620, one outer indicator layer 630, a reflective layer 640.

Reference will now be made to FIG. 19 which shows a seventh illustrated embodiment of the hybrid illuminated indicator sign according to the present invention, as indicated by the general reference numeral 700. The seventh illustrated embodiment of the hybrid illuminated indicator sign 700 is a hybrid illuminated indicator sign 700 for visually displaying indicators when the hybrid illuminated indicator sign 700 is electrically powered and for at least a period of time when the hybrid illuminated indicator sign 700 is no longer electrically powered. The hybrid illuminated indicator sign 700 comprises the light guide plate 710 having a light receiving edge 714 and the light emitting face 711. The outer indicator layer 730 at least partially covers the light emitting face 711 of the light guide plate 710. There is also a reflective layer 740. The electrically powered light source 750 is mounted adjacent the light receiving edge 714 of the light guide plate 710. The photo-luminescent member 720 is mounted adjacent the light receiving edge 714 of the light guide plate 710 and in light receiving relation with respect to the electrically powered light source 750. In use, when the electrically powered light source 750 is emitting light, the emitted light enters the light guide plate 710 through the light receiving edge 714 and is re-directed partially through the outer indicator layer 730 to be visible from the exterior of the hybrid illuminated indicator sign 700, and the emitted light is received by the photo-luminescent member 730 to thereby cause photo-excitation thereof. In use, when the electrically powered light source 750 stops emitting light, light from the photo-excited photo-luminescent member enters the light guide plate 710 through the light receiving edge 714 and is re-directed partially through the outer indicator layer 730 to be visible from the exterior of the hybrid illuminated indicator sign 700.

Reference will now be made to FIGS. 20 through 22 which show an eighth illustrated embodiment of the hybrid illuminated indicator sign according to the present invention, as indicated by the general reference numeral 800. The eighth illustrated embodiment of the hybrid illuminated indicator sign 800 is a hybrid illuminated indicator sign 800 for visually displaying indicators when the hybrid illuminated indicator sign 800 is electrically powered and for at least a period of time when the hybrid illuminated indicator sign 800 is no longer electrically powered. The hybrid illuminated indicator sign 800 comprises the light guide plate 810 having a light receiving edge 814, a first light emitting face 811a and a second light emitting face 811b.

A first translucent photo-luminescent portion 820a at least partially covers the first light emitting face 811a of the guide plate 810 and the second translucent photo-luminescent portion 820b at least partially covers the second light emitting face 811b of the guide plate 810. At least a portion of the first photo-luminescent portion 820a directly faces and may even directly contact the first light emitting face 811a of the light guide plate 810 and at least a portion of the second photo-luminescent portion 820b directly faces and may even directly contact the second light emitting face 811b of the light guide plate 810.

Also, a first indicator portion 830a at least partially covers the first light emitting face 811a of the light guide plate 810 and a second indicator portion 830b at least partially covers the second light emitting face 811b of the light guide plate 810. At least a portion of the first indicator portion 830a directly faces and may even directly contact the first light emitting face 811*a* of the light guide plate 810 and at least a portion of the second indicator portion 830*b* directly faces and may even directly contact the second light emitting face 811*b* of the light guide plate 810.

It can readily be seen in the figures that the first photo-luminescent portion 820*a* and the first indicator portion 830*a* together form a layer over the first light emitting face 811*a* of the light guide plate 810. Similarly, the second photo-luminescent portion 820*b* and the second indicator portion 830*b* together form a layer over the second light emitting face 811*b* of the light guide plate 810. As illustrated, the first photo-luminescent portion 820*a* and the first indicator portion 830*a* are each co-molded one with the other to basically form a layer over the first light emitting face 811*a* of the light guide plate 810, and the second photo-luminescent portion 820*b* and the second indicator portion 830*b* are each co-molded one with the other to basically form a layer over the second light emitting face 811*b* of the light guide plate 810.

Alternatively, the first photo-luminescent portion 820*a* and the first indicator portion 830*a* may be co-extruded one with the other, and the second photo-luminescent portion 820*b* and the second indicator portion 830*b* may be co-extruded one with the other. Alternatively, it is contemplated that any other suitable method of manufacture could be used.

There is also an electrically powered light source 850 mounted adjacent the light receiving edge 814 of the light guide plate 810. As illustrated, the electrically powered light source 850 comprises an LED light strip 850*a*. As illustrated, but not necessarily, the light guide plate 810 has a thickness approximately equal to the width of the LED light strip 850. It has also been found that the light guide plate 810 can have a thickness slightly greater than the width of the LED light strip 850.

A frame 860 substantially surrounds and generally retains the light guide plate 810, the first translucent photo-luminescent board 820*a*, the second translucent photo-luminescent board 820*b*, the first indicator portion 830*a*, and the second indicator portion 830*b*. The hybrid illuminated indicator sign 800 can be mounted on any suitable surface or any suitable retaining structure by an appropriate mounting apparatus 880.

In use, when the electrically powered light source 850 is emitting light, the emitted light enters the light guide plate 810 through the light receiving edge 814 and is re-directed through the first light emitting face 811*a* of the light guide plate 810 to the first photo-luminescent portion 820*a* to thereby cause photo-excitation thereof and also is re-directed through the first light emitting face 811*a* of the light guide plate 810 to the second photo-luminescent portion 820*b* to thereby cause photo-excitation thereof. Light from the first photo-luminescent portion 820*a* is re-emitted at least partially past the first indicator portion 830*a* to be visible from the exterior of the hybrid illuminated indicator sign 800. Also, light from the first photo-luminescent portion 820*a* is re-directed to the indicator portion and is generally blocked by the first indicator portion 830*a* so as to be not visible from the exterior of the hybrid illuminated indicator sign 800.

Further, light from the second photo-luminescent portion 820*b* is re-emitted at least partially past the second indicator portion 830*b* to be visible from the exterior of the hybrid illuminated indicator sign 800. Also, light from the second photo-luminescent portion 820*b* is re-directed to the second indicator portion 830*b* and is generally blocked by the second indicator portion 830*a* so as to be not visible from the exterior of the hybrid illuminated indicator sign 800.

Also in use, when the electrically powered light source 850 stops emitting light, light from the first photo-luminescent portion 820*a* is re-emitted at least partially past the first indicator portion 830*a* to be visible from the exterior of the hybrid illuminated indicator sign 800.

Further, light from the second photo-luminescent portion 820*b* is re-emitted at least partially past the second indicator portion 830*b* to be visible from the exterior of the hybrid illuminated indicator sign 800. Also, light from the second photo-luminescent portion 820*b* is re-directed to the second indicator portion 830*b* and is generally blocked by the second indicator portion 830*a* so as to be not visible from the exterior of the hybrid illuminated indicator sign 800.

In the above described manner, the shape of the first indicator portion 830*a* and the shape of the second indicator portion 830*b* are each readily visible both when the electrically powered light source 850 is illuminated and when the electrically powered light source 850 is not illuminated.

Reference will now be made to FIG. 22 which shows an ninth illustrated embodiment of the present invention, as indicated by the general reference numeral 900. The ninth illustrated embodiment of the present invention comprises a mounting apparatus 980 for mounting the hybrid illuminated indicator sign 900 on a structure. For the sake of convenience, the mounting apparatus 980 is shown twice in FIG. 23. As illustrated, the mounting apparatus 980 comprises a structure-engaging plate 981 that is securable to a structure such as an electrical box 902 that typically is mounted in a wall or ceiling. There is also a bayonet mounting bracket 983 for removable securement to the structure-engaging plate 981. A canopy 982 is securable to the bayonet mounting bracket 983. The canopy 982 abuts against a housing 960. In the ninth illustrated embodiment, the housing 960 comprises a front upper portion 961*f*, a rear upper portion 961*r*, a front lower portion 962*f*, and a rear lower portion 962*r*, which together retain a light guide plate 910, a translucent photo-luminescent layer 920, an outer indicator layer 930, a reflective layer 940, and an electrically powered light source 150. An internal mounting bracket 984 is disposed within the housing 960 for receiving at least one threaded fastener, and in the ninth illustrated embodiment two threaded fasteners 965*a* each extending through a co-operating aperture 982*a* in the canopy 982, through a co-operating aperture 960*a* in the housing 960*a*, and through a co-operating aperture 984*a* in the internal mounting bracket 984, for threaded engagement by a co-operating threaded fastener 965*b*. It can be seen that by using the mounting apparatus 980, the hybrid illuminated indicator sign 900 may readily be mounted directly onto a ceiling, a wall, a floor, or the like, and could be used in a building, a building-like structure such as a shelter, a plane, a train or the like an so on.

Reference will now be made to FIG. 23 which shows a diagrammatic top plan view of a building 101 having a plurality of hybrid illuminated indicator signs 100 according to the present invention installed therein. This aspect of the present invention also relates to the other above-discussed embodiments of the hybrid illuminated indicator sign. The hybrid illuminated indicator sign system, as indicated by the general reference numeral 190, comprises a first hybrid illuminated indicator sign 100*a*, a second hybrid illuminated indicator sign 100*b*, a third hybrid illuminated indicator sign 100*c*, a fourth hybrid illuminated indicator sign 100*d*, and a fifth hybrid illuminated indicator sign 100*e*. An electrical power controller circuit 105 has a first power output 105*a* connected in power supplying relation to the first hybrid illuminated indicator sign 100*a*, a second power output 105*b* connected in power supplying relation to the second hybrid illuminated indicator sign 100b, a third power output 105c connected in power supplying relation to the third hybrid illuminated indicator sign 100c, a fourth power output 105d connected in power supplying relation to the fourth hybrid illuminated indicator sign 100d, and a fifth power output 105e connected in power supplying relation to the fifth hybrid illuminated indicator sign 100e.

The electrical power controller circuit 105 is operable to provide electrical power from the power outputs 105a, 105b, 105c, 105d, 105e in a power cycle that comprises a first power sub-cycle, a second power sub-cycle, a third power sub-cycle, a fourth power sub-cycle, and a fifth power sub-cycle. During the first power sub-cycle, the first hybrid illuminated indicator sign 100a is on and the second hybrid illuminated indicator sign 100b, the third hybrid illuminated indicator sign 100c, the fourth hybrid illuminated indicator sign 100d and the fifth hybrid illuminated indicator sign 100e are off. During the second sub-cycle, the second hybrid illuminated indicator sign 100b is on and the first hybrid illuminated indicator sign 100a, the third hybrid illuminated indicator sign 100c, the fourth hybrid illuminated indicator sign 100d and the fifth hybrid illuminated indicator sign 100e are off. During the third power sub-cycle, the third hybrid illuminated indicator sign 100c is on and the first hybrid illuminated indicator sign 100a, the second hybrid illuminated indicator sign 100b, the fourth hybrid illuminated indicator sign 100d and the fifth hybrid illuminated indicator sign 100e are off. During the fourth power sub-cycle, the fourth hybrid illuminated indicator sign 100d is on and the first hybrid illuminated indicator sign 100a, the second hybrid illuminated indicator sign 100b, the third hybrid illuminated indicator sign 100c and the fifth hybrid illuminated indicator sign 100e are off during the fourth power sub-cycle. During the fifth power sub-cycle, the fifth hybrid illuminated indicator sign 100e is on and the first hybrid illuminated indicator sign 100a, the second hybrid illuminated indicator sign 100b, the third hybrid illuminated indicator sign 100c and the fourth hybrid illuminated indicator sign 100d are off.

Other variations of the above principles will be apparent to those who are knowledgeable in the field of the invention, and such variations are considered to be within the scope of the present invention. Further, other modifications and alterations may be used in the design and manufacture of the modular panel, of the present invention, without departing from the spirit and scope of the accompanying claims.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as", "for example") provided herein, is intended merely to better illuminate embodiments of the invention and does not pose a limitation on the scope of the invention unless otherwise claimed. No language in the specification should be construed as indicating any non-claimed element as essential to the practice of the invention.

Illustrated embodiments of this invention are described herein. Variations of those illustrated embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A hybrid illuminated indicator sign for visually displaying indicators when the hybrid illuminated indicator sign is electrically powered and for at least a period of time when the hybrid illuminated indicator sign is no longer electrically powered, the hybrid illuminated indicator sign comprising:
a light guide plate having a light receiving edge and a light emitting face;
a frame substantially surrounding the light guide plate;
a photo-luminescent member secured to the frame;
an outer indicator layer secured to the frame adjacent the light emitting face of the light guide plate; and
an electrically powered light source mounted within the frame adjacent the light receiving edge of the light guide plate;
wherein the light emitting face of the light guide plate comprises a first light emitting face and a second light emitting face facing opposite from the first light emitting face, and a reflective layer at least partially covering the second light emitting face, the reflective layer being opaque and having a thickness that is less than a thickness of the light guide plate;
wherein in a powered-on state, the electrically powered light source is configured to emit light which causes photo-excitation of the photo-luminescent member, the emitted light entering the light guide plate through the light receiving edge and re-directed through the light emitting face to the outer indicator layer, and partially through the outer indicator layer to be visible from the exterior of the hybrid illuminated indicator sign; and
wherein in a powered-off state, the electrically powered light source is configured to stop emitting light, and light from the photo-excited photo-luminescent member is transmitted partially through the outer indicator layer to be visible from the exterior of the hybrid illuminated indicator sign.

2. The hybrid illuminated indicator sign of claim 1, wherein the photo-luminescent member comprises a translucent photo-luminescent layer at least partially covering the light emitting face of the light guide plate and arranged between the light guide plate and the outer indicator layer.

3. The hybrid illuminated indicator sign of claim 1, wherein the photo-luminescent member is a photo-luminescent portion of the outer indicator layer.

4. The hybrid illuminated indicator sign of claim 1, wherein the outer indicator layer comprises a first outer indicator layer adjacent to the first light emitting face of the light guide plate and a second outer indicator layer adjacent to the second light emitting face of the light guide plate.

5. The hybrid illuminated indicator sign of claim 4, wherein the photo-luminescent member comprises:
  a first translucent photo-luminescent layer at least partially covering the first light emitting face of the light guide plate and arranged between the light guide plate and the first outer indicator layer; and
  a second translucent photo-luminescent layer at least partially covering the second light emitting face of the light guide plate and arranged between the light guide plate and the second outer indicator layer.

6. The hybrid illuminated indicator sign of claim 1, wherein the light guide plate comprises:
  a first light guide plate having a light emitting face; and
  a second light guide plate having a light emitting face and adjacent to the first light guide plate;
  wherein the light emitting face of the first light guide plate faces oppositely from the light emitting face of the second light guide plate.

7. The hybrid illuminated indicator sign of claim 6, further comprising:
  a reflective layer arranged between the first light guide plate and second light guide plate.

8. The hybrid illuminated indicator sign of claim 7, wherein the outer indicator layer comprises a first outer indicator layer adjacent to the light emitting face of the first light guide plate and a second outer indicator layer adjacent to the light emitting face of the second light guide plate.

9. The hybrid illuminated indicator sign of claim 8, wherein the photo-luminescent member comprises:
  a first translucent photo-luminescent layer at least partially covering the light emitting face of the first light guide plate and arranged between the first light guide plate and the first outer indicator layer; and
  a second translucent photo-luminescent layer at least partially covering the light emitting face of the second light guide plate and arranged between the second light guide plate and the second outer indicator layer.

10. The hybrid illuminated indicator sign of claim 1, further comprising an elongate light strip holder retained by the frame adjacent to the light receiving edge of the light guide plate.

11. The hybrid illuminated indicator sign of claim 10, wherein the elongate light strip holder comprises a central vertical flange, a first outer vertical flange, a second outer vertical flange, and a horizontal web interconnecting the central vertical flange, the first outer vertical flange, and the second outer vertical flange.

12. The hybrid illuminated indicator sign of claim 11, wherein the electrically powered light source is mounted within the elongate light strip holder.

13. The hybrid illuminated indicator sign of claim 12, wherein the electrically powered light source is mounted underneath the horizontal web of the elongate light strip holder.

14. The hybrid illuminated indicator sign of claim 1, further comprising a mounting apparatus comprising:
  a structure-engaging plate; and
  a canopy securable to the structure-engaging plate.

15. The hybrid illuminated indicator sign of claim 14, further comprising:
  at least one canopy mounting post extending downwardly from the structure-engaging plate; and
  for each canopy mounting post, a threaded fastener extending through a co-operating aperture in the canopy and threadibly engaging a co-operating canopy mounting post.

16. The hybrid illuminated indicator sign of claim 14, further comprising:
  at least one sign mounting post extending downwardly from the structure-engaging plate, and each sign mounting post having a head portion and a reduced neck portion;
  wherein the frame has a key hole slot for each sign mounting post, and the reduced neck portion of the sign mounting post engages the key hole slot.

17. A hybrid illuminated indicator sign system comprising:
  a plurality of hybrid illuminated indicator signs according to claim 1;
  an electrical power controller circuit having a plurality of power outputs connected in power supplying relation to each of the plurality of hybrid illuminated indicator signs;
  wherein said electrical power controller circuit is operable to provide electrical power from the plurality of power outputs to the plurality of hybrid illuminated indicator signs in a power cycle that comprises a plurality of power sub-cycles, in which in each of the plurality of power sub-cycles electrical power is provided to one of the hybrid illuminated indicator signs and the remaining hybrid illuminated indicator signs are not provided electrical power, and subsequent power sub-cycles provide electrical power to a different hybrid illuminated indicator sign.

\* \* \* \* \*